US008335931B2

(12) United States Patent
Lee et al.

(10) Patent No.: US 8,335,931 B2
(45) Date of Patent: Dec. 18, 2012

(54) INTERCONNECTABLE PERSONAL COMPUTER ARCHITECTURES THAT PROVIDE SECURE, PORTABLE, AND PERSISTENT COMPUTING ENVIRONMENTS

(75) Inventors: Richard M. Lee, San Jose, CA (US); Anthony P. Casano, Felton, CA (US)

(73) Assignee: Imation Corp., Oakdale, MN (US)

( * ) Notice: Subject to any disclaimer, the term of this patent is extended or adjusted under 35 U.S.C. 154(b) by 919 days.

(21) Appl. No.: 12/214,695

(22) Filed: Jun. 20, 2008

(65) Prior Publication Data

US 2009/0319782 A1 Dec. 24, 2009

(51) Int. Cl.
*G06F 11/30* (2006.01)

(52) U.S. Cl. ........................................................ 713/192

(58) Field of Classification Search .................... 713/192
See application file for complete search history.

(56) References Cited

U.S. PATENT DOCUMENTS

| | | | |
|---|---|---|---|
| 6,920,553 B1 * | 7/2005 | Poisner | 713/2 |
| 7,043,587 B2 * | 5/2006 | Burke et al. | 710/302 |
| 7,380,140 B1 * | 5/2008 | Weissman et al. | 713/193 |
| 7,757,100 B2 | 7/2010 | Weissman et al. | |
| 2003/0005278 A1 * | 1/2003 | Deng et al. | 713/2 |
| 2003/0097585 A1 * | 5/2003 | Girard | 713/200 |
| 2005/0262571 A1 | 11/2005 | Zimmer et al. | |
| 2006/0174109 A1 | 8/2006 | Flynn | |
| 2008/0256536 A1 * | 10/2008 | Zhao et al. | 718/1 |

OTHER PUBLICATIONS

KeyPoint Alchemy™ from the RedCannon Security website, http://www.redcannon.com/.
Mar. 5, 2012 Supplementary European Search Report issued in European Patent Application No. 09767018.6.

* cited by examiner

*Primary Examiner* — Cordelia Zecher
(74) *Attorney, Agent, or Firm* — Kenneth E. Levitt; Dorsey & Whitney LLP

(57) ABSTRACT

Disclosed are interconnectable personal computer architectures comprising secure, portable and persistent computing environments that provide secure computing sessions with persistence. The computing environments are implemented using a secure non-computing client device, such as a USB device, that interfaces with a host computer and, optionally, a trusted server. The secure non-computing client device is used to instantiate a secure BIOS and a secure cold or warm boot of the host computer, from the client device, in a host protected area of the host computer, or from the trusted server. The client device comprises a security device, such a trusted platform module, that encrypts and decrypts data transferred between the client apparatus and the host computer to provide a sealed computing environment on the host computer. The client device may implement keyboard logger attack prevention. The client device may also implement a high assurance guard to protect applications. The client device may also comprise security wrapper software that encapsulates malware processed by the host computer. Computing methods and software are also disclosed.

9 Claims, 18 Drawing Sheets

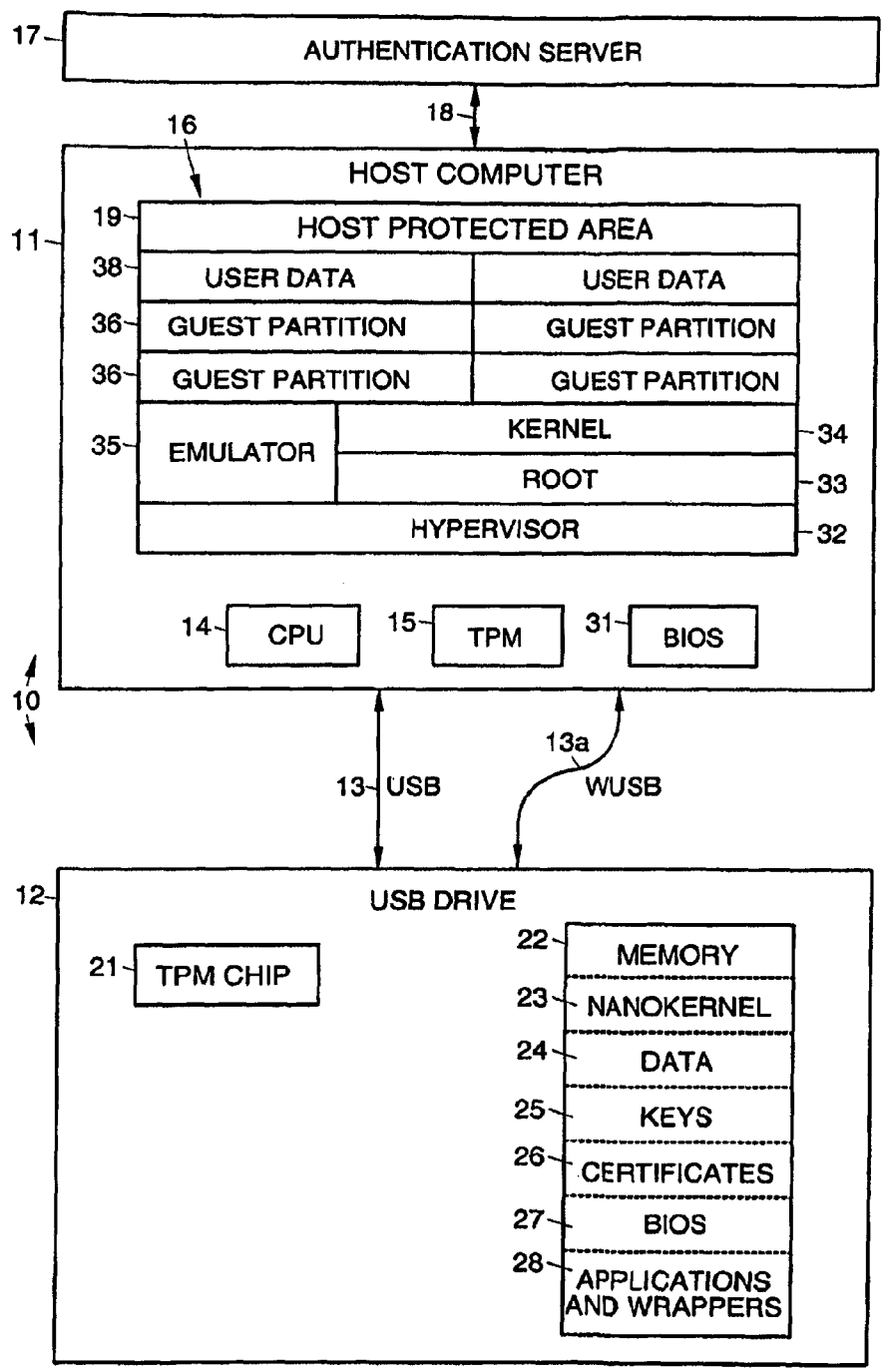

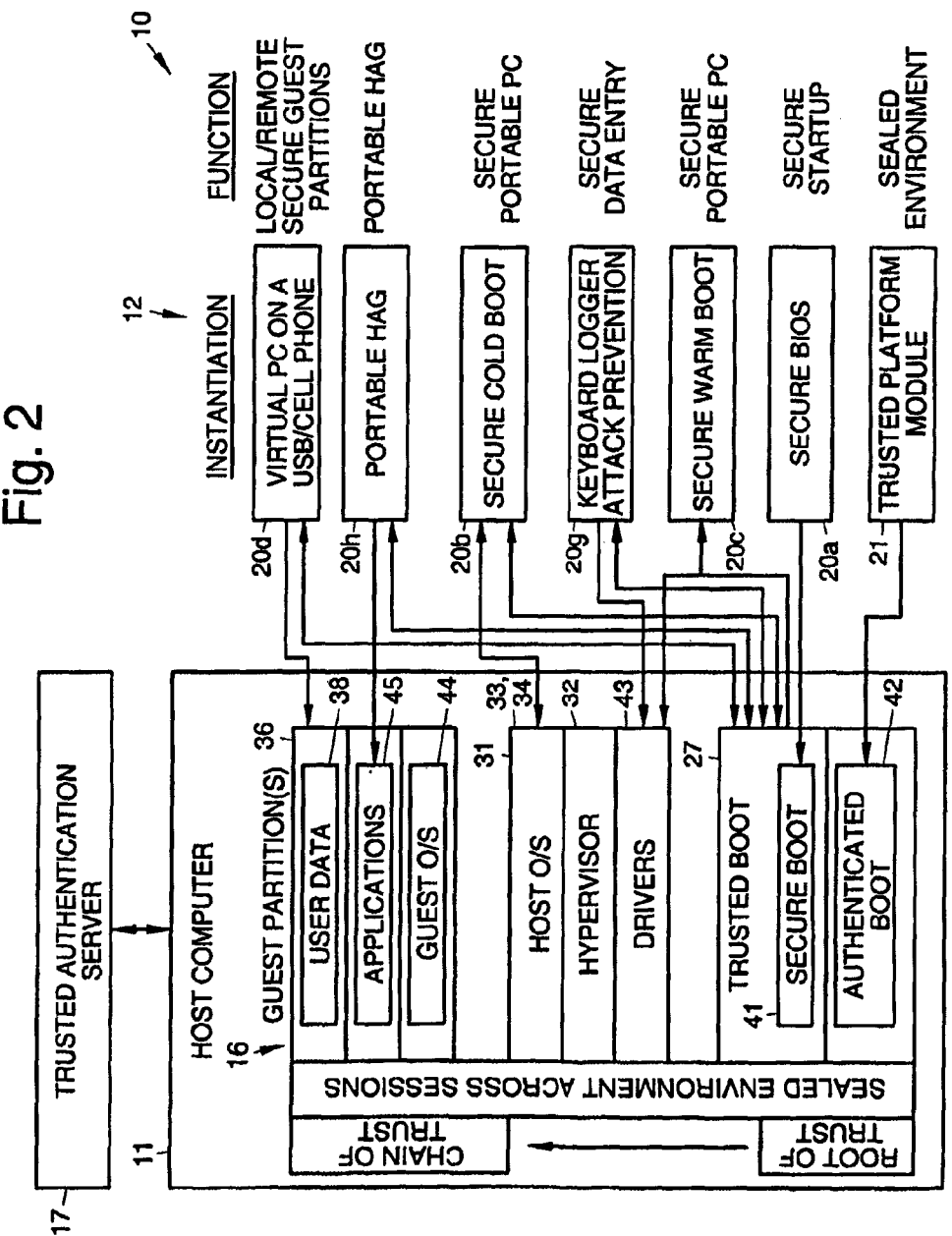

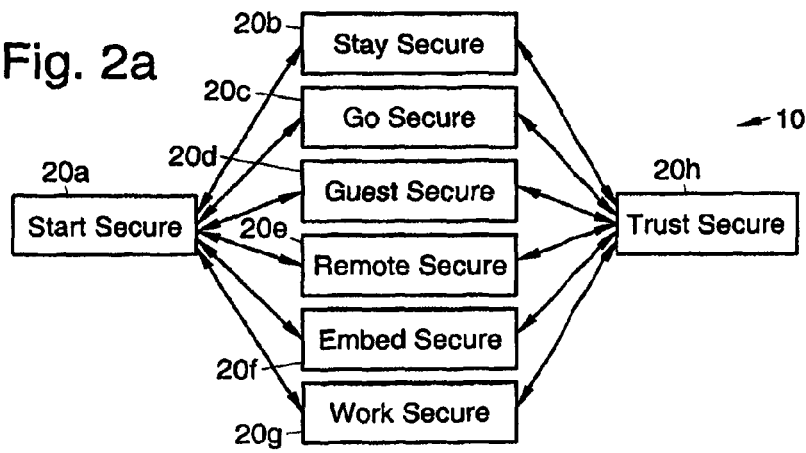
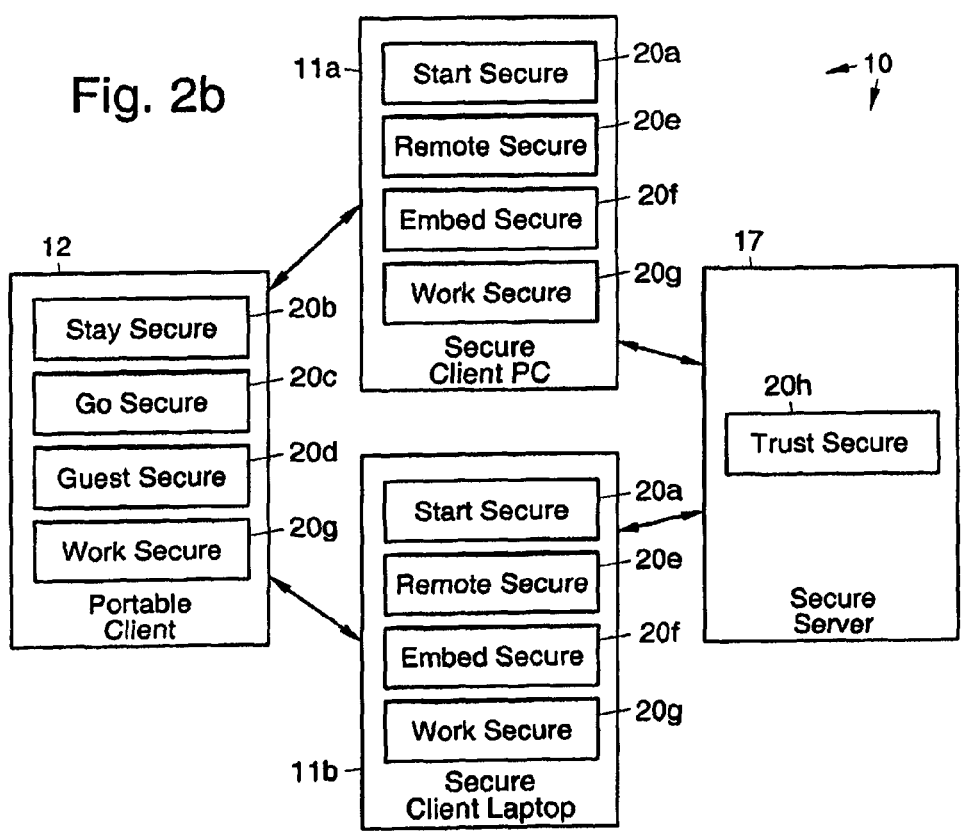

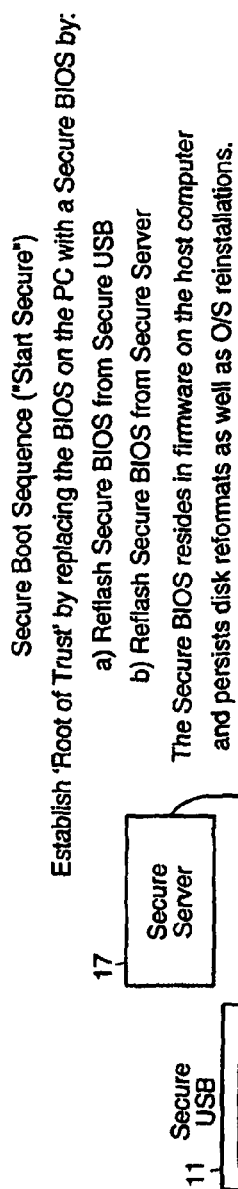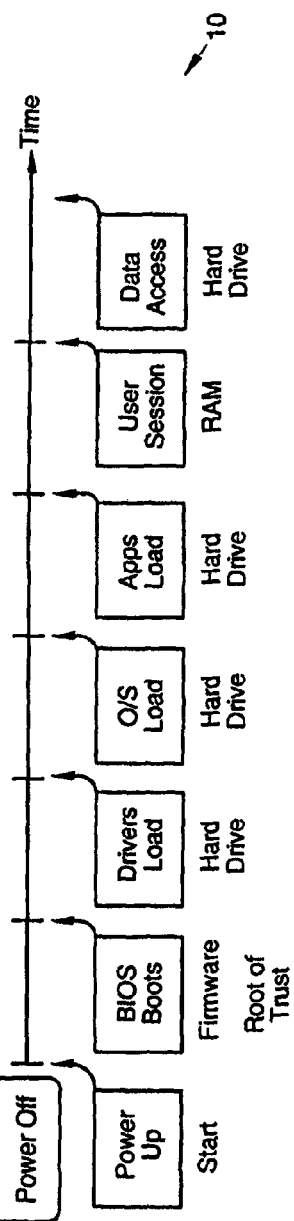
Fig. 3b

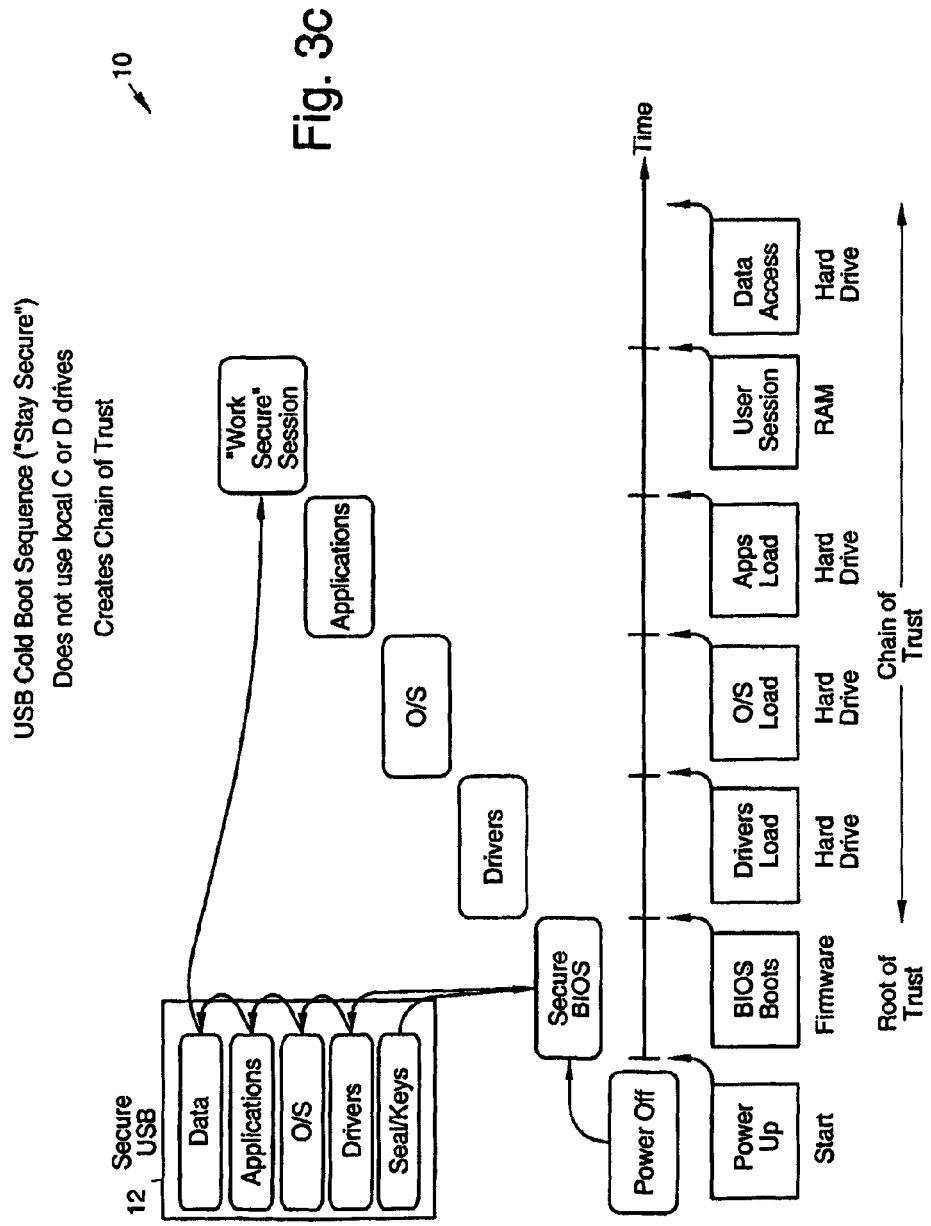

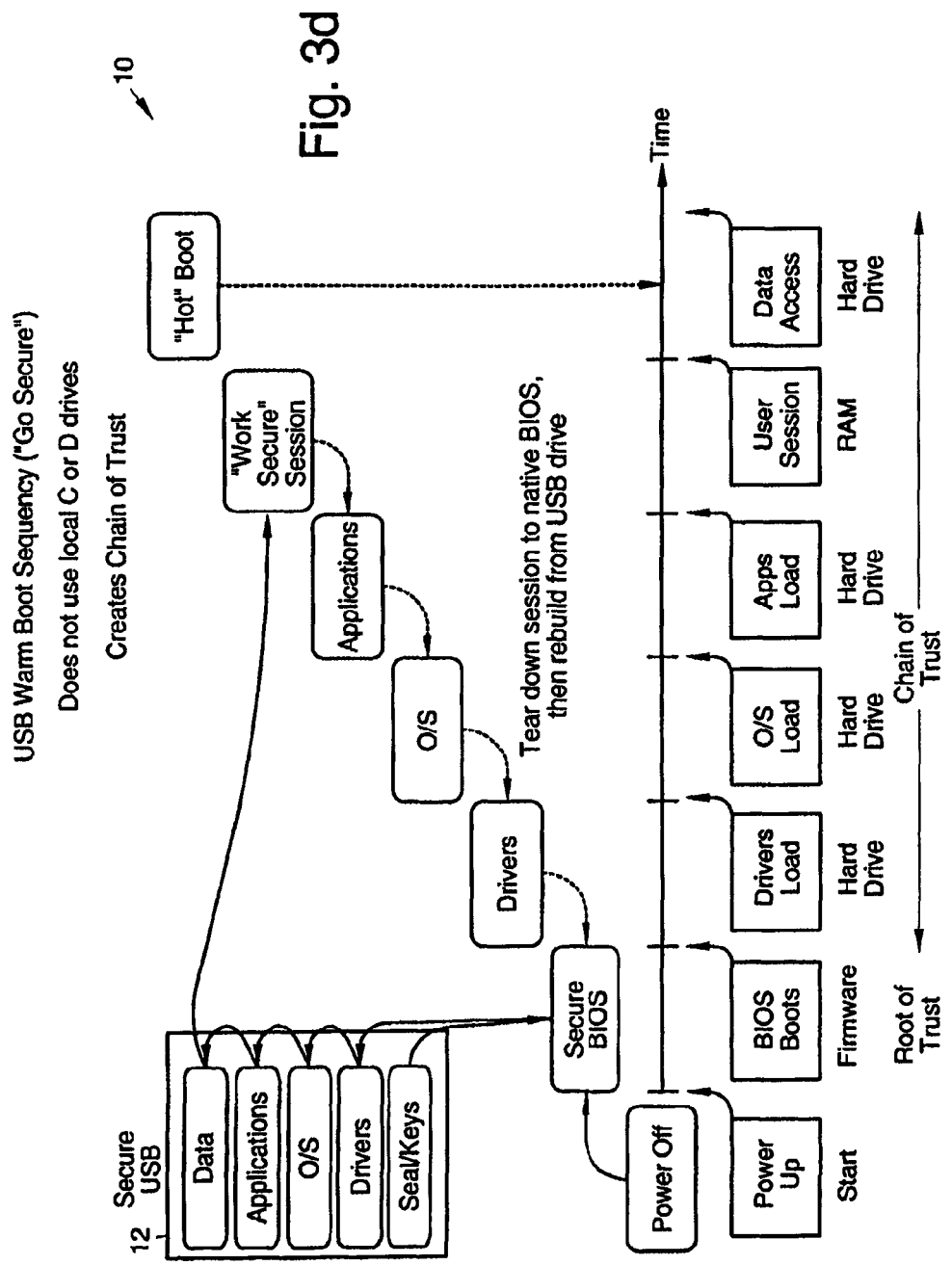

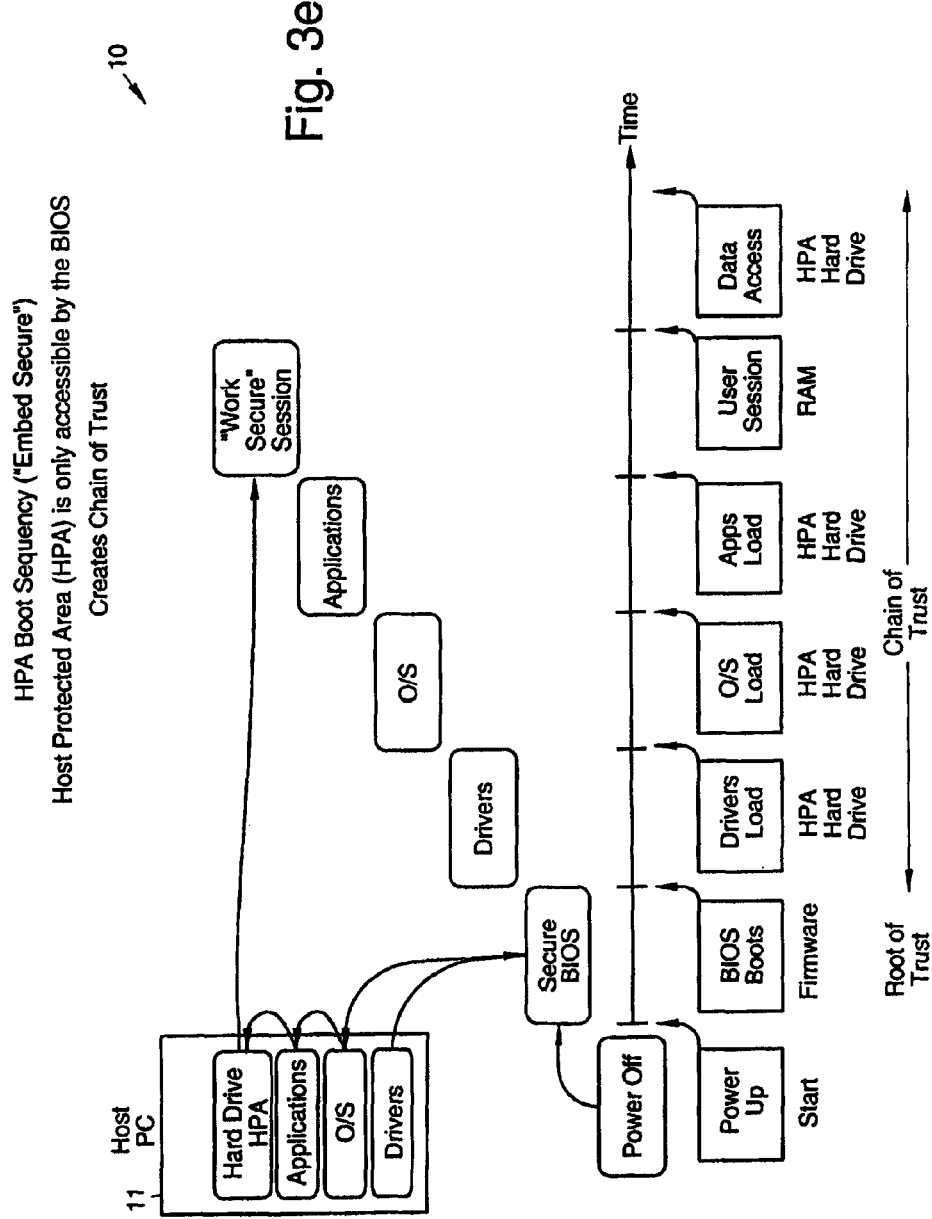

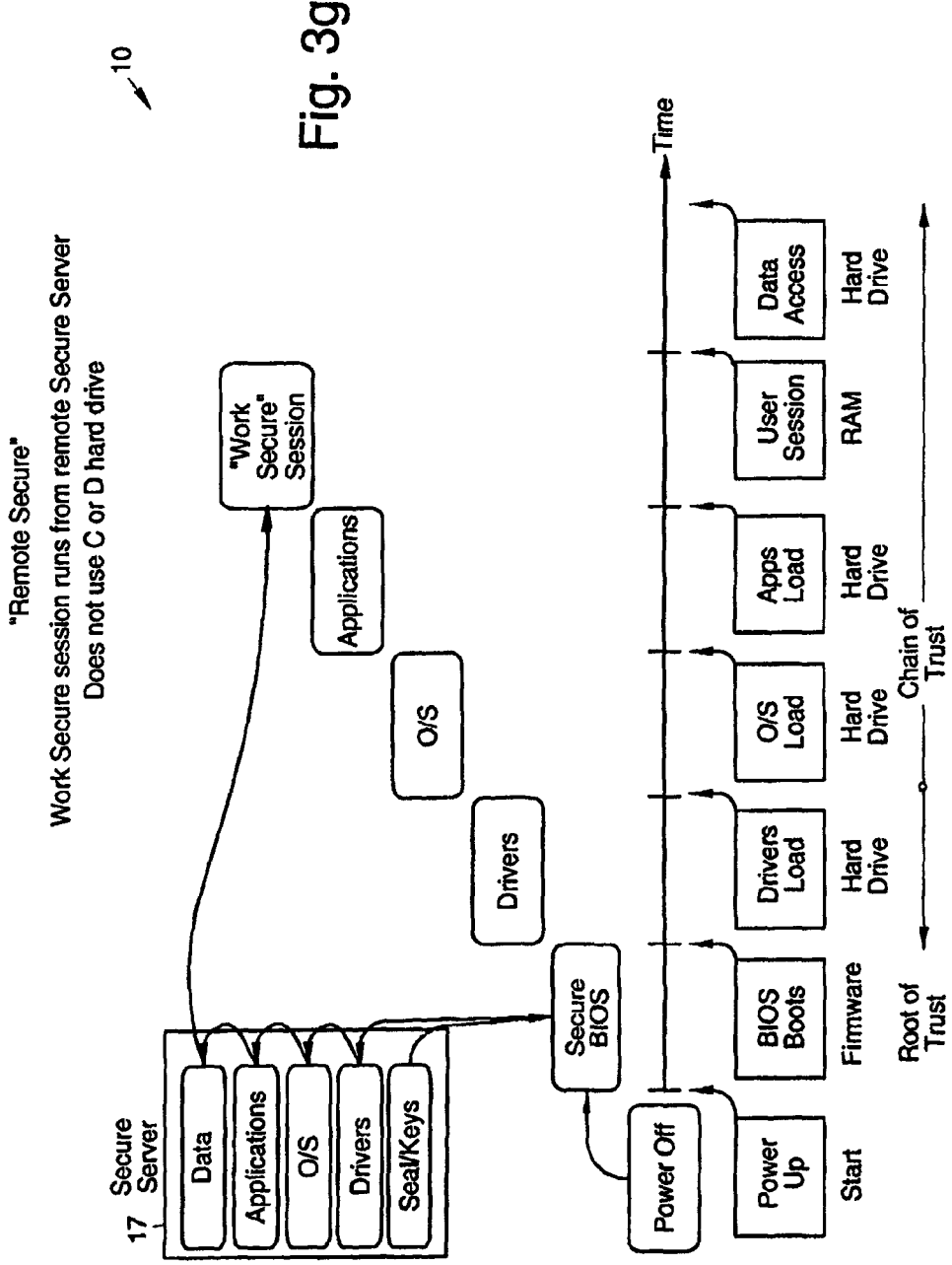

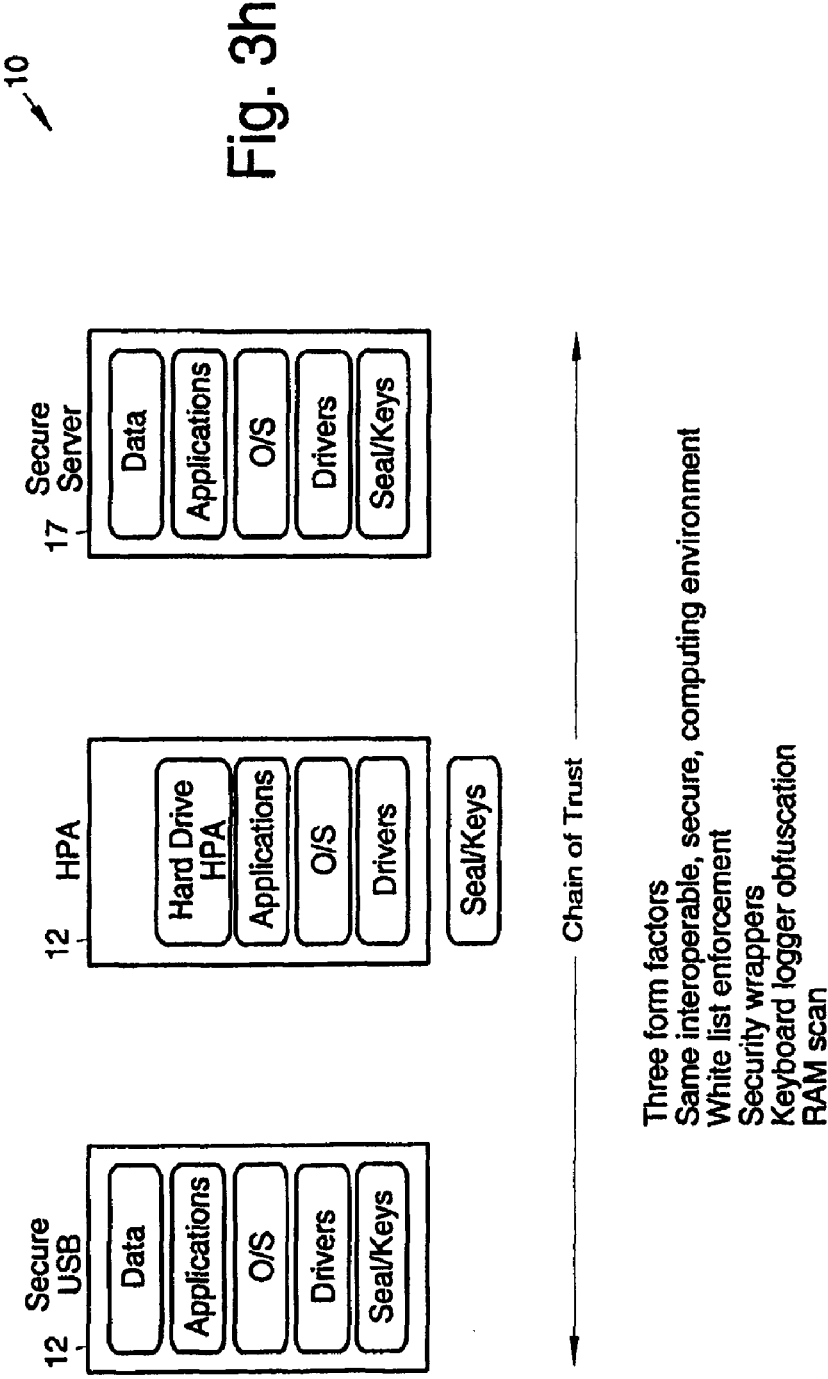

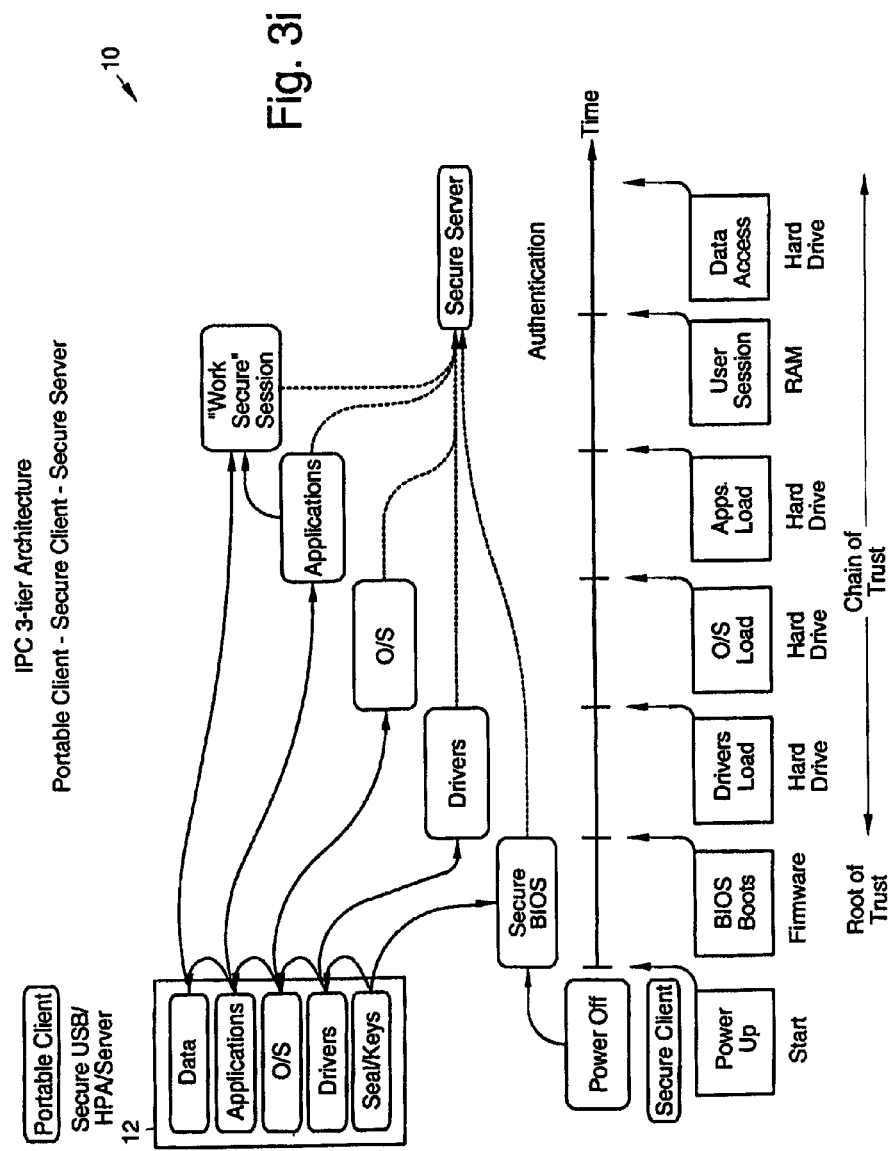

| Character #041h | Character #042h | Character #0B7h | Character #003h |
|---|---|---|---|
| ——— | ——— | ——— | ——— |
| ——— | ——— | ——— | ——— |
| ——@——— | ·@·@·@·@·@·@— | —@——— | ·@·@·@·@·@·@ |
| —@@@——— | ——@@—@@ | —@@@——— | —@@—@@- |
| —@@·@@— | ———@@—@@ | —@@·@@— | —@@—@@- |
| -@@—@@- | ———@@—@@ | -@@—@@- | —@@—@@- |
| -@@—@@- | ———@@·@·@@ | —@@—@@- | —@@·@·@@- |
| -@@·@·@@·@- | ———@@—@@ | -@@·@·@@·@- | —@@—@@- |
| -@@—@@- | ———@@—@@ | -@@—@@- | —@@—@@- |
| -@@—@@- | ———@@—@@ | -@@—@@- | —@@—@@- |
| -@@—@@- | ———@@—@@ | -@@—@@- | —@@—@@- |
| -@@—@@- | ———@@—@@ | -@@—@@- | ·@·@·@·@·@ |
| ——— | ——— | ——— | ——— |
| ——— | ——— | ——— | ——— |
| ——— | ——— | ——— | ——— |

INTERCONNECTABLE PERSONAL COMPUTER ARCHITECTURES THAT PROVIDE SECURE, PORTABLE, AND PERSISTENT COMPUTING ENVIRONMENTS

BACKGROUND

The present invention relates generally to interconnectable personal computer architectures, and more particular, to interconnectable personal computer architectures comprising secure, portable and persistent computing environments.

The National Science Foundation program solicitation NSF 08-521 stated that:

"Computers permeate our world, ranging from networks for all forms of communication to systems designed for monitoring the nation's critical infrastructure to devices for tracking transportation systems, such as airplanes, trains, buses and even private cars. While some systems have been hardened against attack, in many areas, especially systems that control critical infrastructures, the potential remains for attackers to corrupt or commandeer such systems. The systemic vulnerabilities are due to many factors, including: errors in software or in configuration, ill-informed policies that do not account for all hazards, economic restrictions that inhibit the development of appropriate defenses against attacks and misuse, and sheer technical problems that have so far resisted resolution.

Many problems stem from factors of software engineering and attempts to retrofit security measures onto systems. In the extreme, legacy systems must be re-engineered to protect them against security attacks that were not envisaged when those systems were initially designed. Even in modern development regimens, the time and cost required for security certification and performance evaluations is prohibitively high. In the realm of security policies, many issues at the enterprise-wide level are not well understood. The fact that security components are notoriously non-compositional means that policies must be crafted at the overall system level, rather than built up or reasoned about incrementally. Hence, in a complicated, multi-tiered system, security policies must be devised for each level, and the overall system then checked to ensure that lower level policies integrate properly with those at higher levels.

Privacy, anonymity, and accountability in cyberspace are often debated on both technical and policy grounds. The objectives of privacy, anonymity and accountability often conflict with each other and need to be adapted in changing environments. Information has tangible value and real costs. That value depends in part upon the exercise of control and ownership over information and the perceived importance of that information. Its costs depend at least upon storage, bandwidth and processing. Information can also be erroneous, hidden, misused, misrepresented, partial, unverified, conflicting, and certainly personal. Many problems arise from differences in assumptions, expectations, feasibility, and actual use by different stakeholders. Whatever policies on information in cyberspace prevail will have significant impact upon society, commerce, defense, and the individual.

Over the next few decades, computing will be dramatically reshaped. Early trends suggest a greater convergence of software enabled technologies with a wider diversity and presence of applications that build upon a large number of sensors, embedded devices and physical systems integrated through the Internet. In addition to advances in classical computing, functioning quantum devices capable of algorithm processing are expected to be common. Service-oriented architectures may gain a prominent place in the delivery and distribution of differentiated, yet composable, software services. Social networks and information content will be more important to the public and the research community. Critical infrastructures will be bound more closely via our information infrastructure. Unfortunately, convergence and closer integration often introduce new security vulnerabilities. Furthermore, security needs will be different and solutions will have to keep pace with technological advances, mitigating vulnerabilities and weaknesses before they manifest.

The challenges alluded to above promote a need for innovative research ideas driven by newly emerging technologies, new applications that impose new security and privacy requirements, and the ever increasing demand for more people knowledgeable about security."

Malicious internet activity is continuously on the rise, and each new generation of malware becomes increasingly more sophisticated in its technical attack surface, yet it is also becoming easier to use by its manipulator(s). A 'hacker' no longer requires the skills to create malware, but simply needs to know how to use malware to get to information that is desired. With the onset of online banking and payment systems, the chalice of 'identity theft' is the ultimate prize and motivation for most internet attacks. As the demographics of society become more reliant on technology, the risk of electronic theft will become more prevalent and the challenge to protect our information will become even greater as the cost of data loss will outweigh the cost of doing business.

Examples of current vulnerabilities, including asymmetric threats that need to be addressed, are discussed below.

Virtualized machines (VMs) have been in existence and utilized on main frame computers for decades. Recently, however, virtualized machines have become prevalent on desktop and laptop computers, especially those with more memory and multi-core processors that fully benefit from virtualization technologies.

At the time of single-core computers, these vulnerabilities were not developed and thus not envisioned as possible threats. Nowadays, virtualization is relatively inexpensive and easy to use and install. Hypervisors are abundant and some are even 'free'.

An article posted on Apr. 9, 2008 on Forbes' website discussing malware stated that "The decision to switch to virtualization is easy enough: As companies discover that the process can consolidate hardware and save space, energy and money, virtualization is sweeping through the world's desktops and data centers. Now comes the hard part: keeping a new and largely untested IT world safe from hackers and data breaches."

As discussed at the 2008 RSA Convention in San Francisco, several virtualization vulnerabilities are emerging at the forefront of next-generation vulnerabilities:

"Blue Pill," a second, malicious hypervisor that controls the original hypervisor and all of the virtual machines beneath it.

"Virtual Machine Escape," or "Hyperjacking"—By taking control of the hypervisor, the piece of software that controls all the virtual computers within a machine, an attacker can "escape" from any single virtual computer hosted on the machine and quickly multiply his or her access to a company's data.

"Live-Machine Migration"—Virtualization software from VMware and XenSource allows virtual servers to be moved from one physical machine to another with no downtime. But a virtual server could be intercepted in mid-flight, and altered to give a hacker entry into whatever new physical machine it has moved to."

It would be desirable to have the ability to use any available computer without fear of identify theft, or malware to ruin the computing experience. It would be desirable to have a computing environment that provides a 'portable, secure and persistent computing environment' that is always available for a user's personal computing needs. It would be desirable to have a computer environment where the user's preferences and data are securely stored and are available wherever the user is located. It would be desirable to have a computer environment where the user can utilize his or her favorite operating system and tools. It would be desirable to have a computer environment where any available computer may be used, whether you are connected to the Internet or not.

Emerging approaches to computer security are beginning to use trusted platform modules (TPM) to store keys and certificates used in encryption algorithms, and to 'seal' computing environments. The TPM-enabled storage devices are fully encrypted for data-at-rest, but can only be decrypted using the computer used to encrypt the stored data. This is not useful in an enterprise environment where the user wants the data to be portable and protected, and without sacrificing portability for security. Key management may be used to extend key/data sharing across an enterprise, but has not been used with devices that may be used at any location.

As is indicated on their website, RedCannon Security has developed KeyPoint Alchemy™ technology "that transforms any USB Flash Drive into a trusted corporate access and storage device. Alchemy delivers KeyPoint"s power combination of instant endpoint security and mobile encryption to generic flash drives. Only KeyPoint Alchemy delivers a policy driven environment for complete USB device life cycle management from provisioning to password reset to remote data deletion. KeyPoint extends security policy beyond the network perimeter with the convenience of an easy-to-use appliance. However, this USB flash drive solution does not implement secure encrypted BIOS or encrypted trusted boot software.

In addition, it appears that the KeyPoint Alchemy technology does not involve a USB drive that carrys the software (i.e., BIOS, O/S, drivers, applications, etc.) that is necessary to boot a computer. It appears that the KeyPoint Alchemy technology depends upon an internet connection to reach a remote server. Possible attacks to this technology include denial of service to server internet addresses, deleting files off of the server, replacing images on the server, reformatting server disk drives, and flooding the server with remote access requests (i.e., more than it can handle).

There is a need for secure, portable and persistent computing environments, that are platform independent, and which may be implemented using a portable universal serial bus (USB) device, or other portable device, including a cell phone, or PDA, for example, a host computer and a trusted server.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 1 illustrates exemplary interconnectable personal computer architectures comprising secure, portable and persistent computing environments;

FIG. 2 illustrates details of exemplary architectures and secure, portable and persistent computing environments;

FIG. 2a illustrates various instantiations of the interconnectable personal computer architectures showing software modules that may be employed therein;

FIG. 2b illustrates the relationship between individual hardware components and software modules used in different instantiations of the interconnectable personal computer architecture;

FIG. 3b illustrates an exemplary "Start Secure" secure boot sequence;

FIG. 3c illustrates an exemplary "Stay Secure" USB cold boot sequence;

FIG. 3d illustrates an exemplary "Go Secure" USB warm boot sequence;

FIG. 3e illustrates an exemplary "Embed Secure" HPA boot sequence;

FIG. 3g illustrates an exemplary "Remote Secure" boot sequence;

FIG. 3h illustrates exemplary "Work Secure" environments;

FIG. 3i illustrates the boot sequence of the interconnectable personal computer architecture;

DETAILED DESCRIPTION

Figure 3A:
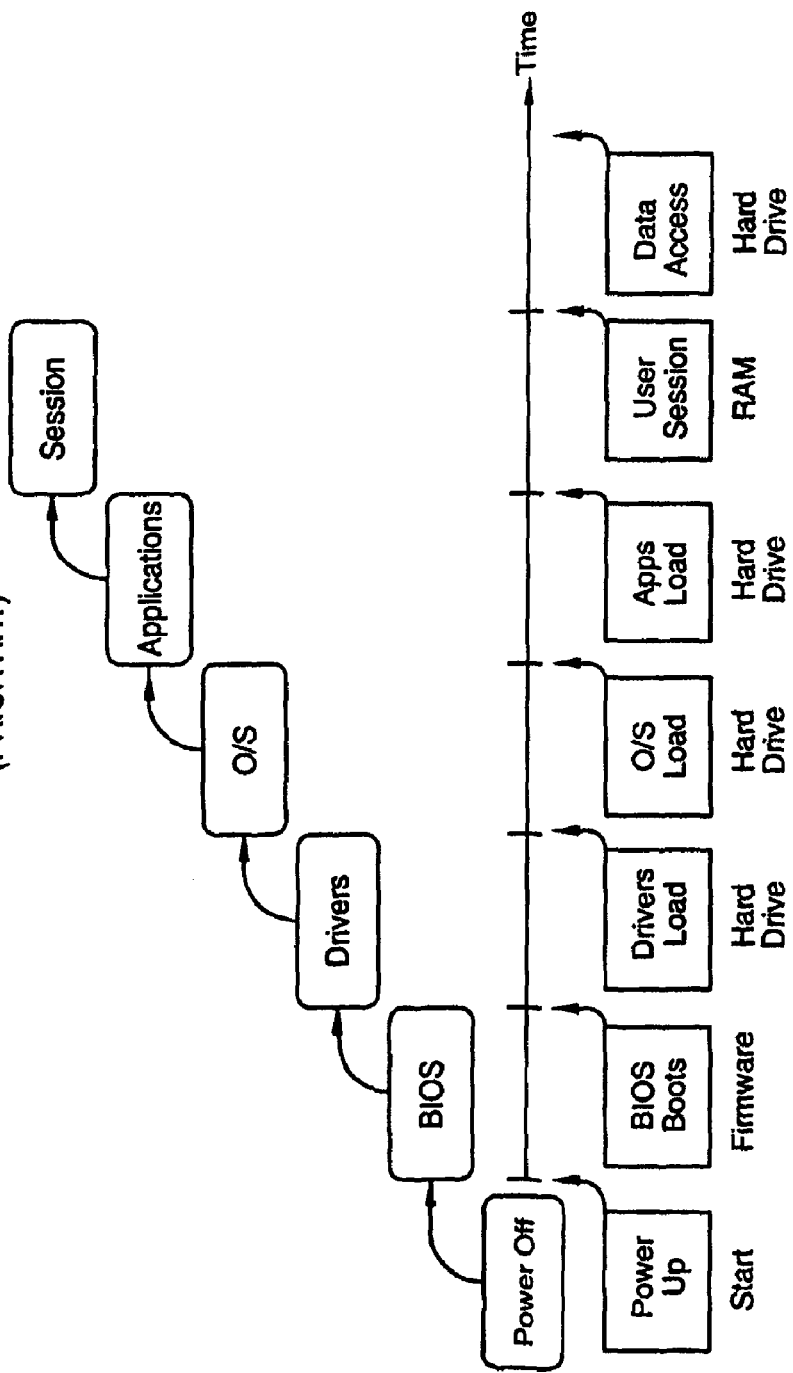
FIG. 3a illustrates an exemplary conventional PC boot sequence.

The approach to the problems discussed in the Background section creates an interconnectable personal computer (iPC™) architecture that is "Centrally Managed, Locally Enabled™." The interconnectable personal computer architecture creates a secure computing environment that may be implemented using a secure portable device, a host computer and a trusted server, along with various software modules that provide differing security functions.

The article "Cloud computing comes into focus" on the GCN website exemplifies the need for a persistent computing. This article indicated that "Many technology experts are predicting a bright future for cloud computing. Rishi Chandra, Google Apps product manager at Google Enterprise, said his company is going after enterprise business in part because organizations are ready to embrace cloud computing.

The reliability of services such as Gmail and ubiquitous access to broadband Internet have led to the rising interest in cloud computing, Chandra said at the Enterprise 2.0 Conference.

Gmail, Google's free Web-based e-mail service, is a basic example of cloud computing. Users access the application and data via the Web rather than from a local e-mail server. Messages are saved in the cloud, so to speak, and not on a user's laptop or desktop PC.

Although he didn't predict that client-based software would disappear, Chandra said he expects a significant rise in cloud computing in the next few years.

One of the biggest hurdles the technology must overcome is enabling users to access data and applications when the Internet is not available."

Referring to the drawing figures, FIG. 1 illustrates exemplary interconnectable personal computer architectures 10 comprising a secure, portable and persistent computing environments 10. The architectures 10 and computing environments 10 comprise a host computer 11, such as a laptop computer 11 or personal computer 11, and a secure portable device 12, such as a universal serial bus (USB) flash device 12, or drive 12, which is connected to the host computer 11. The computing environment 10 may also comprise an authentication server 17, or trusted server 17, which is coupled to the host computer 11 by way of a network 18, such as an intranet 18 or the Internet 18, or a combination thereof.

The various embodiments described herein allow a user to walk up to any host computer 11, engage in a secure computing experience, and then walk away with his or her private data, without leaving a footprint on the host computer 11. This includes personal computers 11 in a business environment, or personal computers 11 in an internet café environment, for example, where systems and system security may be poorly managed. The secure, portable and persistent computing environment 10 are preferably implemented using a portable USB device 12 that is plugged into the host computer 11 when a secure computing session is desired.

As is shown in FIG. 1, the exemplary secure computing environments 10 comprise a host computer 11 and a USB device 12, for example. The host computer 11 comprises a central processing unit (CPU) 14, a trusted platform module (TPM) chip 15, a host protected area (HPA) 19 and a basic input/output system (BIOS) 31. The personal computer 11 also comprises a memory 16 that includes a hypervisor 32, a root 33, a kernel 34, an emulator 35, one or more guest partitions 36 and user data 38. The USB device 12 is coupled to the host computer 11 by way of a USB interface 13 or a wireless USB interface 13a or any other protocol.

The USB device 12 includes a security device 21 such as a trusted platform module (TPM) chip 21 or other encryption/decryption device 21 with a sealed environment for storing keys, certificates, or seals, and a memory 22. The memory 22 is preferably configured in accordance with Moore's law so it is relatively inexpensive and may be scaled to meet increasing memory demands and performance requirements. The memory 22 comprises a nanokernel 23, or minikernel 23, user data 24, encryption keys 25, certificates 26, a secure BIOS 27 and user applications 28 (drivers, emulators, O/S, etc.). The trusted platform module (TPM) chip 21 uses hardware secure encryption and authentication keys 25 and certificates 26 to seal data and enable authentication of each computing session. The security device 21, and in particular, the TPM chip 21 is embedded in the USB device 12. This allows a user to ascertain if the host computer 11 is in the same state of trust as the last time the user used it, and to ensure the BIOS 27, hypervisor 32, root 33, kernel 34, guest partition 36, and/or guest data 38 on the host computer 11 are trusted and secure.

The secure BIOS 27 comprises firmware run by the host computer 11 and loaded from the USB device 12 in addition to the nanokernel 23 or minikernel 23 when it is connected to the host computer 11. The primary function of the secure BIOS 27 is to identify and initiate component hardware comprising the USB device 12 as well as to authenticate the target compute environment to be run on the host computer 11 in the kernel 34, root 33, hypervisor 32 or guest partition 36. This is to secure and authenticate the USB device 12 so that software programs stored on the USB device 12 can load, execute, and assume control of the USB device 12 as well as to secure and authenticate the host computer 11. The main idea is that the user has control over the USB device 12, but not necessarily the host computer 11. If the user loads components that will run on the host computer 11 from his or her USB device 12, then the user has a higher degree of trust that is built upon a secure and authenticated boot stream that the user configured.

The kernel 34, root 33, hypervisor 32 or guest partition 36 and guest data 38 is booted from the nanokernel 23 or minikernel 23 (and the secure BIOS 27) of the USB device 12 depending on user boot preferences configured for a cold boot (power up boot sequence) or a warm boot (plug and play) of the USB device 12. This feature is not present in conventional portable USB devices. The Apple IPOD™, for example, probably has some type of kernel that is used for booting purposes. Also, an article posted on the LinuxDevices website entitled "World's first single-core Linux phone demoed" mentions the possible development of a kernel for a cell phone. However, the secure BIOS 27, nanokernel 23 or minikernel 23 is designed to boot into the host computer 11 when connected to a host PC 11, which is not done with an IPOD or a conventional cell phone; these devices boot themselves.

Emulators 35 in the kernel 34 or the root 33 allow other hardware architecture instruction sets to execute on an x86 architecture, for example, traditionally prevalent on desktop and laptop host computers 11. This enables plug and play capability from the USB device 12 to any host computer 11 in a trusted, secure, and authenticated fashion while remaining transparent to the user.

A key aspect is that it is the user's own virtual computing environment and its entire content may be carried by the user in a trusted, secure, authenticated, and portable manner on the USB device 12, and this environment can execute on any host computer 11. There is nothing left behind on the host computer 11 after the user has completed a computing session. This enables the ability to enforce DRM (Data Rights Management), since the user's content is uniquely identifiable (i.e., encrypted and traceable to the TPM chip 21 on the USB device 12, and the content can only be decrypted with the user's specific TPM chip 21. This ensures to a distributor of content (i.e., music, movie, software, etc.) that only the authorized user is using the content since it cannot be shared by other users (i.e., the guest partition 36, guest data 38, and perhaps the kernel 34 are torn down after the computing session is over).

The nanokernel 23 or minikernel 23 is self-contained and provides for secure booting of the root 33, kernel 34, hypervisor 32 and/or guest partition 36 and guest data 38 from the USB device 12 when connected to a host computer 11. The USB device 12 may be connected to any available host computer 11 by way of its USB interface 13 or wireless USB (WUSB) interface 13a so that it can utilize the host computer's CPU 14 and infrastructure. The nanokernel 23 or minikernel 23 on the USB device 12 is loaded into the CPU 14 of the host computer 11 to perform processing on the host computer 11, and all input/output functions are performed using the secure USB device 12. Thus, no data is stored on the host computer 11 outside of the guest partition 36 when the USB device 12 is connected to the host computer 11 unless the kernel 34, root 33 and/or hypervisor 32 are also installed from the USB device 12. If so, they too are removed at the end of the computing session.

An aspect of the portable secure computing environments 10 is that the nanokernel 23 or minikernel 23 may be configured with one or more specifically allowed applications 28 that are stored on and loaded from the USB device 12 to provide secure applications that are trusted to run on the host computer 11, typically in the guest partition 36. The secure nanokernel 23 preferably only allows the specific trusted applications 28 to be run on the host computer 11 and access or execute on data stored in the user data 38 and shadowed or mapped to the memory 22 of the USB device 12. Any other application is prevented from executing on the data 24 stored on the secure USB device 12.

The interconnectable personal computer architectures 10 and secure, portable and persistent computing environments 10 can streamline a homogeneous enterprise environment in a number of ways. They can provide USB-based homogeneous enterprise environments where the same environment is used at work, home, or while traveling.

There can be a cost savings with respect to the operating system (O/S) and applications 28, etc. Instead of paying for a set of software per computer, the cost shifts to paying for a set of software per user. EIS (enterprise IT services) can negotiate better pricing for a standard set of software, but charge 'per-use' as in enterprise floating licenses, where a user only pays for what is used. All USB devices 12 can have the same set of software tools (applications 28), but a floating license could be used where the user only pays for what is needed. This allows for floating licenses that are not tied to individual users, but to a location or enterprise. This addresses rotational/TDY issues at government sites. This approach is easy to cost and control.

The secure, portable and persistent computing environments 10 can support 'classes' or 'roles' of users: developer, test, CM, QA, etc.

The secure, portable and persistent computing environments 10 provide for plug and play capability between 'classes' or 'roles' of users. The secure, portable and persistent computing environments 10 support "Agile Development," making it easier to switch between development, test, quality assurance, or configuration management activities, and uses the same hardware, but allows better utilization of the common computer resource * host computer 11).

Another benefit allows for re-use of expendable computers 11. Computers 11 that are declassified from an enterprise are usually gutted (i.e., the hard drives are removed and destroyed). Many of the computers 11 are new, but are scrapped because the hard drives must be replaced.

Since the USB device 12 essentially replaces the 'C' and 'D' drive of the computers 11, these computers 11 can be salvaged for other uses. The discarded hulk can be reused along with a USB device 12 having a secure, portable and persistent computing environment 10. The US Government recycles approximately 200,000 computers per month and donates them to schools.

Many companies also donate or recycle their computers, but it may be difficult to determine all their proprietary information has been removed. A USB deployment could ensure there are no leave 'behinds' (i.e., a company can rigorously inventory the USB devices 12 or can (remotely) decommission them as required. Use of the secure computing environments 10 allows a company to re-purpose a gutted computer by providing a new USB device 12. The USB device 12 is operating system agnostic. An educational USB device 12 may be created so schools can utilize recycled computers. The content of each USB device 12 may be tailored per subject (Math, Science, English, etc.). Use of the secure USB devices 12 thus creates a new business model for scrapped computers 11 that heretofore have been discarded.

The architecture 10 (FIG. 1) provided by the secure computing environments may provide a service to other organizations or customers that cannot afford the infrastructure, cannot afford a dedicated EIS staff, or want their environment and data protected, but only want to pay for a 'service'. A hosting company could mitigate 'risk' by contracting with offline storage companies to provide 24/7 SLA (Service Level Agreement), provide fail over capability, or provide data protection or duplication.

The architectures 10 provided by the secure computing environments 10 provides a flexible, configurable architecture to address government needs such as DARPA's National Cyber Range or the Air Force Cyber Command. DARPA's National Cyber Range website states in its PROGRAM OBJECTIVE AND DESCRIPTION section that the National Cyber Range (NCR) will enable a revolution in the Nation's ability to conduct cyber operations by providing a persistent cyber range that will: (1) Conduct unbiased, quantitative and qualitative assessment of information assurance and survivability tools in a representative network environment, (2) Replicate complex, large-scale, heterogeneous networks and users in current and future Department of Defense (DoD) weapon systems and operations. (3) Enable multiple, independent, simultaneous experiments on the same infrastructure. (4) Enable realistic testing of Internet/Global-Information-Grid (GIG) scale research. (5) Develop and deploy revolutionary cyber testing capabilities. (6) Enable the use of the scientific method for rigorous cyber testing.

The architectures 10 provided by the secure computing environments 10 can (1) enable multiple, independent, simultaneous experiments on the same infrastructure, (2) allow development and deployment of revolutionary cyber testing capabilities, (3) enable the use of the scientific method for rigorous cyber testing, and (4) provide additional revenue streams (as royalties or services) in finance, healthcare, insurance, the pharmaceutical industry and entertainment, including movies, music and gaming industries.

Once a secure, portable and persistent computing environment 10 is implemented in an enterprise architecture, the potential for custom 'payloads' provided onto the secure USB drives 12 becomes infinite. A key aspect is to shift the computing paradigm from what is known and used today to that of a secure, portable and persistent computing environment 10.

FIG. 2 illustrates details of exemplary architectures 10 and secure, portable and persistent computing environments 10. FIG. 2a illustrates various instantiations of the interconnectable personal computer architectures 10 showing software modules 20a-20h that may be employed therein. FIG. 2b illustrates the relationship between individual hardware components 11a, 11b, 12, 17 and software modules 20a-20h used in different instantiations of the interconnectable personal computer architecture 10.

When the host computer 11 is initially booted, the secure BIOS 27 installs a plurality of drivers 43, the hypervisor 32 and host operating system (O/S) 33, 34, and sets up one or more guest partitions 36. The guest partitions 36 are configured to load a guest operating system (O/S) 44, user applications 45 and user data 38.

As is shown in FIG. 2, the USB device 12 may be configured to embody one or more technologies that provide security and persistence with respect to computing sessions encountered when a user connects the USB device 12 to the host computer 11 or when the host computer 11 is connected to the authentication server 17 by way of the network 18. These technologies may selectively implement or instantiate (1) a virtual personal computer (PC) 20d, comprising a virtual PC software module 20d, which may be embodied in a USB drive, cell phone, personal digital assistant (PDA) or other secure portable device 12, (2) a portable high assurance guard (HAG) 20h, comprising a portable HAG software module 20h, embodied in the secure portable device 12, (3) a secure cold boot 20b, comprising a secure cold boot software module 20b, embodied in the secure portable device 12, (4) keyboard logger attack prevention 20g, comprising a keyboard logger attack prevention software module 20g, embodied in the secure portable device 12, (5) a secure warm boot 20c, comprising a secure warm boot software module 20c, embodied in the secure portable device 12, (6) a secure BIOS 20a, comprising a secure BIOS software module 20a, embodied in the secure portable device 12, and (7) a trusted platform module (TPM) 21 embodied in the secure portable device 12.

The virtual PC software module 20d embodied on a USB device 12, cell phone or personal digital assistant, for example, provides local and remote secure guest partitions on the host computer 11. The portable high assurance guard (HAG) software module 20h implements a layer 8 USB device 12 having an embedded CPU and memory. It is used in conjunction with the host computer 11 to route layer 2-3 traffic to be filtered by the HAG on the layer 8 USB device. The secure cold boot software module 20b secures the host computer 11 when it is cold booted and implements secure drivers 43 on the host computer 11. The keyboard logger attack prevention software module 20g provides for secure data entry on the host computer 11 and implements secure drivers 43 on the host computer 11. The secure warm boot software module 20c secures the host computer 11 when it is warm booted and implements secure drivers 43 on the host computer 11. The secure BIOS software module 20a provides for a secure boot 41 resulting in secure startup of the host computer 11. The security device 21, such as the trusted platform module (TPM) 21, provides for an authenticated boot 42 resulting in a sealed computing environment on the host computer 11. Together, the security device 21 and the secure BIOS software module 20a create a 'root of trust' to build a 'chain of trust' that can be infinitely extended to various custom secure, portable and persistent computing environments 10.

The architectures 10 use a security device 21 or chip 21 having trusted platform module (TPM) or similar functionality embedded in a portable device 12 having a data memory 22, such as a portable USB device 12, for example, to produce the secure portable device 12. The data stored in the memory 22 is encrypted and decrypted using the embedded security device 21. The only component that is necessary for computing by the user is a host computer 11.

The security device 21 on the secure portable device is used to encrypt and decrypt the data as well as seal a computing environment 11, 12. The secure portable device 12 may be used to securely perform the functions in conjunction with the host computer 11.

USB device storage capacity tends to increase in step with Moore's Law, and in accordance with the teachings contained herein, the USB device 12 is configured to have the storage capacity necessary to store drivers, one or more operating systems, applications, and data, thus realizing a portable, secure and persistent client computing environment 10. The client environment 10 may be implemented using the secure portable (USB) device 12, in the host protected area 19 of the host computer 11, or may be remotely booted from the trusted server 17.

As shown in FIG. 1, in accordance with the teachings disclosed herein, additional strengths can be gained by incorporating a root of trust capability to ensure a computing session starts securely, and building up a chain of trust to securely continue the computing session. The trusted server 17 may be configured to authenticate, restrict, and confirm the client environment and peripherals to lock down an entire enterprise environment that is not limited by network connection. In this secure client environment 10, only components that the user can trust may be interconnected or are allowed to connect to a network 18.

The secure capabilities of the portable, secure and persistent computing environments 10 may be implemented using the software modules 20a-20h shown in FIG. 2a, for example, that are used on the secure portable (USB) device 12, the host computer 11 and the trusted server 17 shown in FIG. 2a. These software modules 20a-20h are referred to herein as "Start Secure™" 20a, "Stay Secure™" 20b, "Go Secure™" 20c, "Guest Secure™" 20d, "Remote Secure™" 20e, "Embed Secure™" 20f, "Work Secure™" 20g, and "Trust Secure™" 20h software modules. These software modules 20a-20h may be used in certain combinations to construct a secure computing environment by and between the secure portable (USB) device 12, the host computer 11 and the trusted server 17.

As shown in FIG. 2, the "Start Secure" software module 20a comprises trusted boot software that establishes a root of trust on the client environment (secure portable device 12 or host computer 11) by providing a secure session start as well as a mechanism to seal the computing environment 10 across sessions when the user is no longer logged in. The "Start Secure" software module 20a detects any hardware, firmware or software changes made to the client environment without the user's consent.

As shown in FIG. 2b, a chain of trust is continued by using one of three secure USB software module options.

(1) The "Stay Secure" software module 20b provides a mechanism to cold start a host computer 11 into any desired operating system environment, including the user's favorite tools and data, all of which are encrypted in real-time during use. If utilized with a device containing a "Start Secure" module 20a, computing session are resistant to firmware malware attacks.

(2) The "Go Secure" software module 20c provides a mechanism to warm start a host computer 11 into any operating system environment that is desired, including the user's favorite tools and data, all of which are encrypted in real-time during use. This option works with non-"Start Secure" embodiments, but could be vulnerable to firmware malware attacks. However, embodiments using the Go Secure software module 20c are more portable across various hardware platforms.

(3) The "Guest Secure" software module 20d provides virtualization ability to load a guest partition from the secure USB device 12 into either a local host computer 11 or remote trusted server 17.

All three of these software modules 20b-20d store no data in the host computer 11 because a local disk space is not utilized, and in fact, the operating system and applications installed on the host computer 11 are not used. The operating system, applications and data are derived from the secure portable device 12. All software is stored on a read/execute only partition of the secure portable device 12, while all user data is encrypted and decrypted each time memory is read from or written to the secure portable device 12 (i.e., data-in-motion). The above embodiments provide for a portable client 12-client 11a, 11b-server 17 architecture where each component reinforces another component as security building blocks to form an increasingly secure and scalable system, depending on the availability of secure components.

Enterprise boot sequence settings may be configured so that:

If a server 17 configured with the Trust Secure software module 20h is reachable, then it is used as an authentication server and/or host to support remote "Guest Secure" sessions or a "Remote Secure" 20e network boot source. The user may be on an internal intranet, or are using a virtual private network (VPN) to securely tunnel through the Internet to the "Trust Secure" server 17.

If a "Trust Secure" server 17 is not reachable, then the client is not on the enterprise intranet. In this case, it is determined if the client is enabled with a Start Secure software module 20a. If it is, then the "Start Secure" module 20a is used to create a 'root of trust'. Otherwise, it is determined if the client is enabled with a "Embed Secure" software module 20f. If it is, then the user can boot from a host protected area 19 (FIG. 1). The "Work Secure" software module 20g may be used as a safety barrier to protect RAM in the host computer 11, and is loaded from the USB device 12.

If the user is not using an enterprise client, then the "Start Secure" module 20a and/or Embed Secure module 20f will not be found. In this case, the user may be at an Internet café, for example, with a secure USB device 12 which is configured to support a "Stay Secure" module 20b allowing a cold boot from the secure USB device 12 into the local host computer 11, a "Go Secure" module 20c allowing a warm boot from the secure USB device 12 into the local host computer 11, a "Guest Secure" module 20d allowing a boot from the secure USB device 12 to VPN into a Trust Secure server 17 over the Internet, and a "Work Secure" module 20g as a safety barrier to protect RAM in the host computer 11.

The Remote Secure module 20e provides another diskless option to remote boot from the Trust Secure server 17. A client image is stored on the "Trust Secure" server 17, just like on the secure USB device 12, but is loaded remotely over an internet connection via virtual private network (VPN) from the trusted server 17 to the client. This is a thin client running a remote connection to the "Trust Secure" server 17 using a secure authentication scheme.

The Embed Secure module 20f is an option to take the same client image stored on the secure USB device 12, and place it into the host protected area 19 that only a "Start Secure" module 20a that provides a root of trust can access. The image is managed centrally from the Trust Secure server 17, but is enabled locally by the "Start Secure" 20a root of trust. This ensures that no user or software can tamper with the host protected area 19 shown in FIG. 1.

The Remote Secure and Embed Secure modules 20e, 20f are useful in environments where USB devices 12 are not allowed into a physical facility, and can enforce a security policy to specifically prohibit USB usage. Depending on needs, the "Trust Secure" server 17 may be notified of any intentional violations of the policy.

The three secure USB options ("Stay Secure," "Go Secure," and "Guest Secure" software modules 20b, 20c, 20d) have an additional benefit to switch between sessions at the speed of a boot from the secure USB device 12. The three options are not dependent upon local disks of the host computer 11, software, or Internet connection. This enables the secure USB device 12 to operate on just about any computer as long as it has a USB connection or other bootable device.

The "Work Secure" module 20g provides additional protection mechanisms including encryption of executables; keyboard logger obfuscation; security wrappers; enhanced password protection (i.e., arrow key combination display); white list enforcement; and persistent authentication (i.e., continuous face recognition and/or palm print scanner) to solidify the client environment to make it resistant and tolerant to malware infections. Persistent authentication provides a non-intrusive way to ensure that only the authorized user is using the system at any given time, not just at start up or single sign-on (SSO).

The secure USB device 12 may also have a finger print biometrics device and an LCD display for a personal access code (FIG. 7) which may be configured to recycle every minute, for example, with a new random number sequence. Additional persistent authentication features may also be realized, which only displays a random number sequence if finger print biometrics has been passed. This results in display power savings and extend battery life, it does not need an embedded, self-powered battery (can utilize a rechargeable battery) and can recharge when connected to host computer, and additional protection of a random seed generator may be employed (i.e., the display is not always on for someone to 'crack' the random number seed value). Additionally, instead of a one time authentication, a continuous automatic authentication is maintained with the Trust Secure server 17 and/or the "Start Secure" 20a root of trust.

The "Work Secure" module 20g provides confidence and reassurance that the computing environment is safe. This security environment runs without user interaction, and notifications can be configurable based upon security policy and rules.

The Trust Secure module 20h can be used to configure a client's computing environment via signed updates and secure configuration management information to assert positive control over a client environment. It can authenticate, restrict, and confirm a client's computing environment and sessions as well as peripherals connected to the client. It would be desirable for the Trust Secure server 17 to have a remote, secure, out-of-band connection to the host computer 11 by implementing an Alerts Standard Formats (ASF 2.0) specification or Intel® Active Management Technology (AMT) capability.

The interconnectable personal computer architecture 10 is centrally managed, and locally enabled. The interconnectable personal computer architecture 10 is a complete enterprise solution that is scalable to support a portable, secure and persistent computing environment 10 on any computer, anywhere, and anytime.

Clients of the interconnectable personal computer architecture 10 have the portability of a stand alone secure USB plug and play capability (similar to most current laptop deployments) but compatible with any computer, and the form factor of a portable device 12 (i.e., USB, cell phone, PDA, etc.) instead of a laptop.

Additionally, the secure USB device 12 can leverage an enterprise laptop 11b or desktop computer 11a and implement the "Start Secure" 20a environment to establish a 'root of trust', and create a 'chain of trust' into "Stay Secure" 20b, "Go Secure" 20c, "Guest Secure" 20d, "Remote Secure" 20e, or "Embed Secure" 20f environments. The "Work Secure" 20g environment may be provided as a safety net for the previously-mentioned environments to prevent, detect, and contain spreading of malware.

Finally, the "Trust Secure" server 17 can provide end-to-end protection across the portable client-client-server architecture 10 to authenticate all client peripherals. This reinforcement of components creates a highly integrated 'chain of trust' to (1) reduce the attack surface (i.e., a "Work Secure" environment) by providing read/execute-only images, protected RAM, keyboard obfuscation, and persistent authentication, (2) create a relatively large attack surface by providing a portable client-client-server architecture 10 where an attacker needs to penetrate all three environments to be successful, and (3) authenticate and enforce use of authorized peripherals.

In a "Boot Secure" environment instantiated by the "Stay Secure" software module 20b, the host computer 12 is rebooted into a secure environment from a secure USB device 12. In an authenticated, secure USB drive boot environment (a "Stay Secure" environment or a "Go Secure" environment tied to a secure BIOS 27) a user hot plugs a secure environment from a specific USB device 12 enforced by a secure BIOS 27 (FIG. 2) into the host computer 11. Using the plug and play secure USB computing environment ("Go Secure" software module 20c), a user hot plugs a secure environment from a secure USB device 12 into the host computer 11. The keyboard logger attack prevention environment ("Work Secure" software module 20g) implements innovative obfuscation techniques to deter keyboard loggers. The "Go Secure" software module 20b provides a cold boot environment on a host computer 11 using a secure USB device 12. Using the portable HAG 20h embodiment, high assurance guard functionality is implemented as a "Layer 8" computer on the USB device 12, to provide a dedicated processor to filter all incoming and outgoing traffic separate from the host computer 11. Using the virtual PC embodiment "Guest Secure" 20d, a user executes a secure environment in a local or remote guest partition 16 (FIG. 2) from the secure USB device 12.

The secure, portable and persistent computing environments 10 may be embodied as a personal computer implemented on a USB device 12, cell phone, or personal digital assistant, that comprises a virtual secure computing environment 10, in a manner disclosed in U.S. patent application Ser. No. 11/985,408, filed Nov. 15, 2007, the contents of which are incorporated herein by reference.

The secure, portable and persistent computing environments 10 may also comprise a portable high assurance guard implemented on a USB device 12. The computing environments 10 may comprise keyboard logger attack prevention 20g which may use a rotary dial fed by a random number generator, and/or keyboard buffer flooding scheme to inject random characters, randomly rotating through different font settings, and changing window objects to those not currently in view or use. The computing environments 10 may comprise the "Boot Secure" environment comprising a secure USB device boot, wherein a secure environment from a specific USB device 12 plugged into a host computer 11 supplemented by a secure BIOS 27 used to boot the host computer 11, and validate, authenticate, and enforce a policy to only allow authorized devices to access the computer 11 or network 18 via local enforcement or server-side validation. One scheme is to prioritize first from the server 17 to authenticate end-to-end compliance. If the network 18 is not available or the host computer 11 is used locally, then the client-side host computer 11 can authenticate local usage. If the (local) host computer "C" or "D" hard drive is missing, then the host computer 11 can boot directly from the USB or other portable device 12. The computing environments 10 may comprise "Boot Secure" integration to the host protected area 19, wherein the "Boot Secure" environment is ported to the host protected area 19 without the need for a user to carry a USB device 12. The computing environments may also comprise a plug and play secure USB computing environment.

Thus, the concepts disclosed herein provide for secure, portable and persistent computing environments 10 that are centrally managed and locally enforced. The secure, portable and persistent computing environments 10 may have multiple instantiations that implement different levels of security.

The secure, portable and persistent computing environment 10 may comprise a secure client embodied in a secure USB device 12 carried by a user, that contains a secure client environment. This secure client does not use 'C' or 'D' hard drive of the host computer 11.

The secure client may comprise warm start "Go Secure" software 20c, where the host computer 11 is warm booted from the secure USB device 12 carried by the user. This embodiment does not require a power cycle of the host computer, has plug and play capability, uses existing BIOS 31 in the firmware on the host computer 11, tears down all existing applications 45 and device drivers 43 on the host computer 11, loads and installs all device drivers, hypervisor, and 'trusted' applications from the secure USB device 12, and user data is encrypted and stored in the secure USB device 12.

The secure client may comprise cold start "Stay Secure" software 20b, wherein the host computer 11 is cold booted from the secure USB device 12, carried by the user. This embodiment requires a power cycle of the host computer 11, uses existing BIOS 31, which may have been upgraded to "Start Secure" 20a, in firmware on the host computer 11, loads device drivers, hypervisor, and 'trusted' applications from the secure USB device 12, and all user data is encrypted and stored in the secure USB device 12.

Benefits of using the warm start and warm start versions of the secure clients are that the host computer 11 can always boot up even if its hard disk drive is damaged, removed, reformatted, or its operating system is de-installed. The user boots from the portable secure USB device 12 connected to any computer 11, and the secure USB device 12 only allows a 'trusted' applications stored in the secure USB device 12, that are known to be free of malware, to be used. The secure USB device 12 enforces a homogeneous client environment.

In addition, the secure USB device 12 may be configured to 'seal' the client computing environment. To accomplish this, the secure USB device 12 may embody a trusted platform module (TPM) chip 21 on the secure USB device 12, or other similar technology, that comprises a sealed integrated circuit for 'sealing' the computing environment against unauthorized use or changes. The trusted platform module chip 21 uses hardware secure encryption and authentication keys and certificates to seal data and enable authentication of each computing session on a host computer 11 or a trusted server 17.

The secure client may be embodied in the host protected area 19 configured on the host computer 11. This secure client embodies the same content as the secure USB device 12, but it is stored on a hard drive of the host computer 11. The host protected area 19 is only accessible by the BIOS 27 that runs on the host computer 11. This prevents user modification of the computing environment, all executables are stored in the host protected area 19, and data is only stored on the 'C' or 'D' drive of the host computer 11. Benefits of this secure client are that there is no need to carry a separate secure USB device 12 to boot the host computer 11, it is useful for work areas that do not allow a USB device 12 to be used (i.e., a classified environment), it only allows trusted applications in the host protected area 19 to be used, and it enforces a homogeneous client environment.

The secure client may utilize a secure network boot. This secure client embodies the same content as the secure USB device 12, but it is stored on a remote trusted server 17 (authentication server 17). This provides for a remote boot of the host computer 12 over a network 18 from the trusted server 17, and the user can remove all hard drives from the host computer 11, which is useful in a classified environment. Benefits of this secure client are that there is no need to carry a separate secure USB device 12 to boot the host computer, the host computer 11 can always boot up even if the hard disk is damaged, removed, reformatted, or the operating system is de-installed, it is useful for work areas that do not allow a USB device 12 to be used (i.e., a classified environment), it is "centrally managed" from the trusted server 17, it enforces a homogeneous client environment, and it can be imaged regardless of host computer state (ASF 2.0 or Intel AMT standard).

The sealed, host protected area 19 and secure network boot embodiments of the secure client may also embody trusted boot software (i.e., warm start or warm start software).

The contents of the secure USB device 12 may also be customized for specific purposes, including provisions for the high assurance guard 20h (FIG. 2), a development environment, a unit test environment, an integration test environment, a configuration management environment, a quality assurance environment, a computer forensic environment, and educational subjects environments such as math, science, and English, for example. Benefits of these embodiments are that there is no need to reformat the hard drive of the host computer 11, there is no need to even have a hard drive, and the user can recycle a discarded or gutted computer (i.e., one having the hard drive removed). Many other instantiations of a secure USB 12 can be supported with the interconnectable personal computing architecture 10 for each mission specific capability.

The trusted boot software ("Start Secure") creates a 'root of trust' on which computing security is based. The trusted boot software may comprise secure boot software implemented using a secure BIOS 27. This protects a single computing session from power-up to end of session (logout), and creates a 'chain of trust', which may be referred to as "Stay Secure." The "Stay Secure" environment is provided even if someone else uses the host computer 11, it protects across computing sessions, it provides a tamper resistant environment that can detect hardware, firmware, or software changes, it requires reflashing of the BIOS 31, and it requires enabling TPM functionality. The trusted boot software may alternatively comprise authenticated boot software implemented with a trusted platform module (TPM) chip 21 that 'seals' a computing environment against unauthorized changes. The trusted boot software may also be used in conjunction with the authentication server. Benefits are that the trusted boot software creates a 'root of trust' for "Start Secure," "Go Secure," and "Stay Secure" and it provides for a persistent 'root of trust', that is tamper resistant.

The boot sequence involves use of the secure BIOS 27 which may be located on the authentication server 17 that is accessed remotely over a network 18, from the secure USB device 12, from the host protected area 19, or from the C or D drives of the host computer 11, with varying degrees of trust and security. In the case of the authentication server, these implementations may involve the use of an intranet or a network that is generally trusted, or the Internet, which is not trusted. In the case of using the host protected area 19, this is somewhat secure, although the operating system, device drivers and software must be trusted.

The authentication server 17 is a trusted server 17 that holds secure client images, and provides key management, authentication of the client environment, enforcement of authorized peripherals (i.e., only 'known' USB keys can execute on the host computer 11). This provides for a centrally managed, locally enforced secure computing environment. The authentication server 17 provides for remote boot over a network 18 from a trusted server 17. A user can remove all hard drives on the host computer 11, which is desirable in a classified computing environment. The authentication server 17 can securely and remotely update the host computer 11 with signed updates.

Benefits of using the authentication server are that it creates a 'chain of trust' for the whole enterprise. There is no need to carry a separate secure USB device 12 to boot the host computer 11. The host computer 11 can boot up even if its hard disk is damaged, removed, reformatted, or the operating system is de-installed. It is useful for work areas that do not allow a USB device 12 to be used (i.e., a classified environment). It may be "centrally managed" from the trusted server 17. It enforces a homogeneous client environment. It can be imaged regardless of host computer state (ASF 2.0 or Intel AMT standard). It allows 100% inventory control. It allows for on-the-fly configuration of a secure network.

Additional security features may also be provided in conjunction with the above-described embodiments.

The host computer 11 may be configured to utilize keyboard logging obfuscation 20g. Keyboard logging obfuscation 20g (FIG. 2) provides for random character injection. Keyboard logging obfuscation 20g may implement a 'combination' spin dial with random start sequence for passwords, PIN, etc. Keyboard logging obfuscation 20g may provide for random window focus. Keyboard logging obfuscation 20g may provide for the use of random font and/or language sets. Keyboard logging obfuscation may be enabled using a software application, and a filter for user applications. Keyboard logging obfuscation 20g may be implemented using a soft keyboard, for example. Keyboard logging obfuscation 20g may embed an RSA token display into the secure USB device 12 as part of an enhanced authentication scheme.

Persistent authentication may be used to enhance single sign-on authentication. An application may be used to continuously validate the user with non-obtrusive biometrics such as face recognition and/or palm print reader on a computer mouse, for example.

Computer forensic characteristics (i.e., usage by other people or devices) may be combined with access decision to increase security.

A timer may be employed to erase the secure USB device 12 if it not used with a predetermined amount of time.

Applications may be encrypted and all applications other than trusted applications may be treated as malware. An attacker will not know the encryption-decryption algorithm. The applications are stored in an encrypted fashion, and the applications and data are decrypted in order to use them. If malware is present, it will be decrypted, but it will be unrecognizable since it is not encrypted to begin with.

Security wrappers may be used to contain any malware entering RAM. Security wrappers may be constructed using Generic Software Wrappers Toolkit prototype software, for example, available on the SPARTA Information Systems Security Operation (ISSO) website. The information on this website indicates that the "Generic Software Wrappers Toolkit prototype provides software "wrapping" technology to significantly increase the security and reliability of large software systems composed of standardized software components." The toolkit provides tools to create and manage "wrappers," which are software modules that conceptually surround standard software components (shell, browser, and server applications) to observe, augment, and/or control their interaction with other components. Appropriate wrappers may be added to the code of the secure applications 28 stored in the secure portable device 12. The wrappers may be configured to add new functionality to inter-component interactions, and increase the security and reliability of systems built from standard software components, without modifying the components themselves.

White list enforcement may be used to enforce authorized usage of vetted software applications. The white list includes all the applications and O/S files on the host computer 11 and prevents overwriting or replacing them.

More detailed discussions of the various secure environments are presented below.

Boot Secure Cold Boot Environment

In the "Boot Secure" environment, the USB device 12 is configured to carry all of the user's secure applications as well as an operating system to run those applications. The "Boot Secure" environment does not expect any level of integrity or security on a resource that is outside of what is on the USB device 12. In addition, the operating system 23 (nanokernel 23 or minikernel 23) and all of the applications 28 are certified that they have not been altered in some fashion once they have been loaded into the memory 22 of the USB device 12.

Along with the operating system 23 and the applications 28, the user carries data that must also be protected. Whereas the operating system 23 and applications 28 can be stored in read-execute-only partitions, the data 24 must be written as well. The best way to protect against any malware code from having access to (either to modify or steal) the data 24, is to not mount the volume where the data 24 is stored until the host computer 11 is locked down (i.e., secured).

An IronKey secure device 12, for example, shows up as two separate devices; one that looks like a USB CD-ROM (read only device) and the other that looks like a USB storage device (read-writable device). Furthermore, the IronKey secure device 12 encrypts the USB storage data, protecting the data from offline attacks.

FIG. 3*a* illustrates an exemplary conventional PC boot sequence. In this typical PC boot sequence, a computer is powered on and the BIOS in the firmware boots. The drivers then load from the hard drive. The operating system (O/S) loads from the hard drive. The applications are then loaded from the hard drive. A user session then begins using the host computer 11 and data may be read from and written to the hard drive.

FIG. 3*b* illustrates an exemplary "Start Secure" secure boot sequence. There are two methods to reflash the host computer BIOS 11: 1) reflash from USB; 2) reflash from a remote server. The secure BIOS persists in memory and survives disk reformats and O/S reinstallations. In the "Start Secure" secure boot sequence, a secure USB device 12 is inserted into a USB port of the host computer 11. The host computer 11 is powered on and is booted from the secure USB device 12 using secure BIOS disposed thereon. This may require another reboot for the secure BIOS to load from memory. Alternatively, the secure BIOS can be reflashed over the network connection from a remote server. Secure drivers from the host computer 11 are loaded. The secure operating system (O/S) from the host computer 11 is loaded. Applications from the host computer 11 are loaded. A user session then begins using the host computer 11 and data may be read from and written to the hard drive of the host computer 11.

FIG. 3*c* illustrates an exemplary "Stay Secure" USB cold boot sequence. In the "Stay Secure" secure boot sequence, a secure USB device 12 is inserted into a USB port of a powered up host computer 11. The host computer 11 is rebooted from the secure USB device 12 using secure BIOS disposed thereon. Secure drivers from the secure USB device 12 are used. The secure operating system (O/S) from the secure USB device 12 is used. Secure applications from the secure USB device 12 are used. A "Work Secure" user session then begins using the host computer 11 and data is read from and written to the USB device 12.

FIG. 3*d* illustrates an exemplary "Go Secure" USB warm boot sequence. In the "Go Secure" secure boot sequence, a secure USB device 12 is inserted into a USB port of a powered up host computer 11. The host computer 11 is rebooted (warm booted) from the secure USB device 12 using the secure drivers, the secure BIOS 27 and the secure O/S disposed thereon. The session running on the host computer 11 is torn down to the native PC BIOS 31 and then rebuilt from the secure USB device 12. The native PC BIOS may have been previously upgraded to a Secure BIOS as described in the "Start Secure" scenario. After teardown, secure drivers from the secure USB device 12 are loaded. The secure operating system (O/S) from the secure USB device 12 is loaded. Secure applications from the secure USB device 12 are loaded. A "Work Secure" user session then begins using the host computer 11 and data may be read from and written to the USB device 12.

FIG. 3*e* illustrates an exemplary "Embed Secure" HPA boot sequence. In the "Embed Secure" secure boot sequence, the host computer 11 is powered on and the BIOS in the firmware boots. A host protected area is configured that is only accessible by the BIOS. The drivers are then loaded from the host protected area. The operating system (O/S) is then loaded from the host protected area. The applications are then loaded from the host protected area. A "Work Secure" user session then begins using the host computer 11 and data may be read from and written to the host protected area.

Figure 3F:
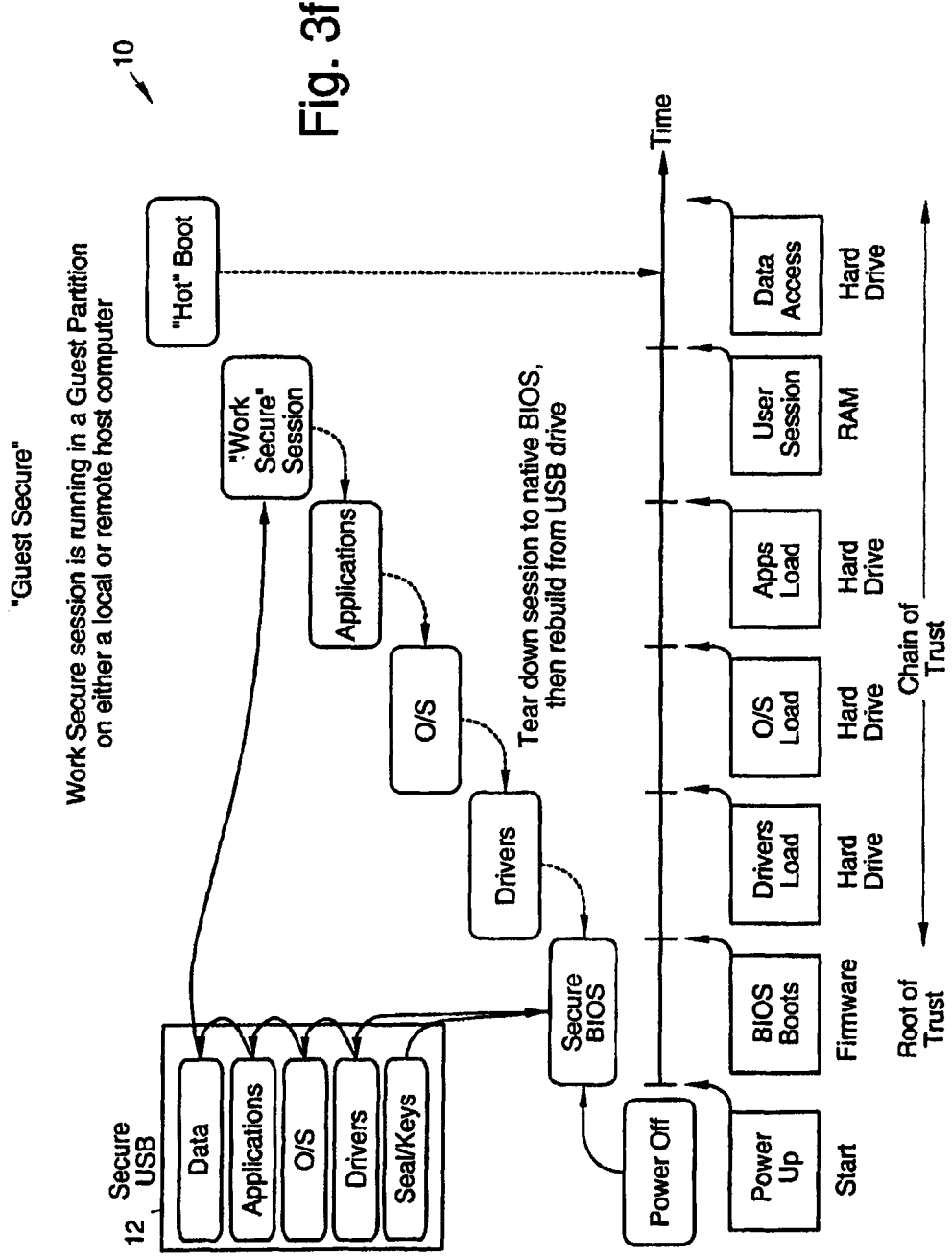
FIG. 3f illustrates an exemplary "Guest Secure" boot sequence.

FIG. 3*f* illustrates an exemplary "Guest Secure" boot sequence. In the "Guest Secure" secure boot sequence, a secure USB device 12 is inserted into a USB port of a powered up host computer 11. The host computer 11 is rebooted (warm booted) from the secure USB device 12 using the secure drivers, the secure BIOS 27 and the secure O/S disposed thereon. The session running on the host computer 11 is torn down to the native PC BIOS 31 and then rebuilt from the secure USB device 12. A secure guest partition is created on the host computer 11. After teardown, secure drivers from the secure USB device 12 are loaded. The secure operating system (O/S) from the secure USB device 12 is loaded. Secure applications from the secure USB device 12 are loaded. A "Work Secure" user session then begins in the secure guest partition on the host computer 11 and data may be read from and written to the USB device 12.

FIG. 3*g* illustrates an exemplary "Remote Secure" boot sequence. In the "Remote Secure" secure boot sequence, a powered up host computer 11 is connected to a secure server 17. The host computer 11 is rebooted from the secure server 17 using secure BIOS, seals and keys disposed thereon. The secure BIOS from the secure server 17 creates a root of trust. The drivers are then loaded from the Secure Server. A secure operating system (O/S) and secure applications on the secure server 17 are used. A "Work Secure" user session then begins on the secure server 17 that is accessed by the host computer 11, and data is read from and written to the secure server 17.

FIG. 3*h* illustrates exemplary "Work Secure" environments. There are three form factors for the "Work Secure" environment. One is instantiated using the secure USB device 12. Another is instantiated using the host protected area configured on the host computer 11. Another is instantiated using the secure server 17. Substantially the same secure computing environment is set up using any of the three instantiations. The three instantiations create a chain of trust across the interconnected components. The three instantiations allow use of only secure applications, security wrappers, and may use keyboard logger obfuscation and RAM scanning programs.

FIG. 3i illustrates the boot sequence of the interconnectable personal computer architecture 10. The interconnectable personal computer architecture 10 comprises the secure client which may be implemented using the secure USB device 12, the host protected area, or the secure server 17. The secure device 12, host protected area or server 17 utilize the secure drivers, O/S, applications and data to implement the "Work Secure" session across the interconnected components of the architecture 10.

Figure 4:
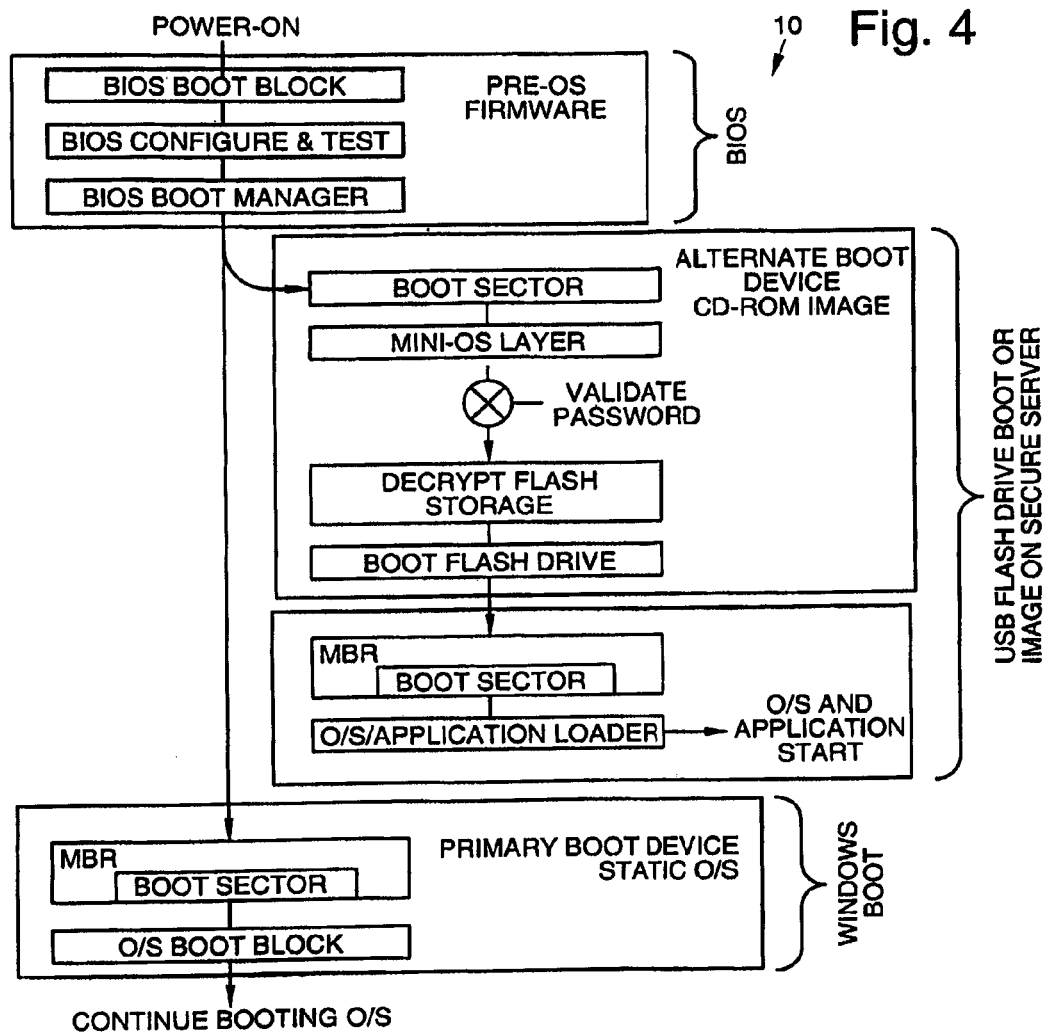
FIG. 4 illustrates secure booting of a USB device embodiment of the secure, portable and persistent computing environment.

FIG. 4 shows how the BIOS 31 on the host computer 11 can boot a primary or alternate boot device. This alternate boot device is the USB device 12 or secure server 17, which contains a thin operating system layer (the nanokernel 23 or minikernel 23) that is configured to validate the user's password, decrypt the data stored on the USB device, and boot the target operating system 23 and application(s) 28.

The "Boot Secure" environment dramatically reduces the vulnerability to attacks, since it is the only code executing before the Boot Secure environment takes over the BIOS 31. The exposure to a software attack from an unknown BIOS can be minimized by carrying and loading hardware drivers 43 for the devices required for the secure computing session.

Exposure to hardware attacks can be minimized based on the target tasks. For instance, for specific secure internet tasks, all network communications may be encrypted to the secure server 17. For general internal, browsing encrypted communications to a TOR (The Onion Router) server could be used, since the first server in the chain could handle the encrypted communications.

To defeat hardware keyloggers, the secure operating system may use a soft-keyboard 51 (FIG. 5) to enter passwords and type emails. This is less convenient, but since no screen grabber malware can be running on the secure OS, there is no simple way of grabbing the screen data.

Regarding the security risk assessment, the Boot Secure environment is configured based upon which security risk levels are acceptable, balanced by cost and user convenience. The Boot Secure environment limits software attacks to those of the unsecured BIOS 31 of the host computer 11, and then minimizes those attacks by replacing required BIOS functions with drivers 43 from the USB device 12.

There are many approaches that must be balanced with cost and user convenience to address the possible hardware attacks. As mention above, a soft-keyboard can defeat the hardware keylogger devices.

O/S-Loader

The O/S-loader (O/S application loader) shown in FIG. 4 is an executable application (OSLOADER.EXE). The O/S-loader application is a very thin secure OS loader that may be designed for use with an IronKey (or IronKey-like) secure USB flash drive device 12.

The OSLOADER.EXE application is a BIOS extension, meaning that the assumed operating environment includes only functionally that was present at the end of POST (Power On Self Test) and a simple file systems that is provided by the disk operating system (DOS). The design philosophy uses the BIOS 31 to put the system/hardware to an operating state, shut down all runtime operations, and only rely on OSLOADER code to manage the system, to get the use's input, and launch the secure O/S. This approach reduces the risk booting up on a questionable or unsecured BIOS 31.

Referring to FIG. 4, the OSLOADER program is only a small part of a much bigger program. The end solution provides secure functionality to the user on an unsecured or unknown system. This functionality may be a secured email communication, or a secured internet browser, for example, and executes under a Linux or other non-Windows environment that is completely loaded from a secure USB device 12, such as the IronKey flash drive.

An IronKey device 12 stores all data in an encrypted manner and requires the user to enter a password before the device 12 can be booted. The functionality of OSLOADER is to take in the user's password, unlock the USB device 12 (through the device's APIs), and launch the secure operating system.

This approach of creating a DOS program that interfaces directly with hardware whenever possible is not the only way the O/S loading function may be performed. Depending on the interface needs of the USB device 12 (USB control interface, library, etc.), this approach may not be the most efficient solution. However, the risk exposure associated with this approach is easy to determine, since there no code that goes outside itself to perform any task, unlike Linux or 'C' which heavily rely on outside libraries to accomplish their tasks.

The O/S-loader (application secures the password entry mechanism. Several different solutions have been developed to defeat hardware and software keylogger programs.

Figure 4A:
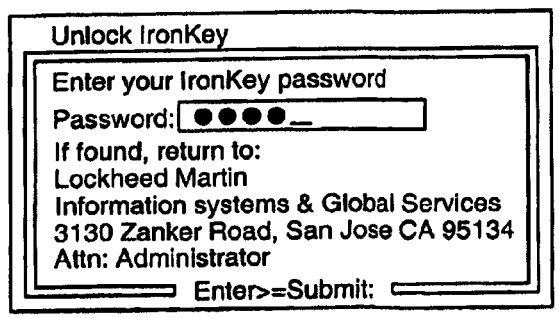
FIG. 4a is a screenshot of an exemplary initial authentication screen of an OSLOADER program.

Although the OSLOADER user presentation may be made very elaborate, an initial implementation uses text mode to enter the password. FIG. 4a is a screenshot of an exemplary initial screen of the OSLOADER program, with the 'suppress program messages' option enabled.

The exemplary OSLOADER program support text mode dialogs that mimic functionality present in graphical user interface systems, with the exception that there is no mouse support. All input is keyboard input only.

The OSLOADER program main dialog includes similar features of the IronKey graphical interface, such as displaying the 'If found, return to' personal message. This feature can help guard against phishing attacks, since this message is completely customizable and can be set to something only the user is aware of. The OSLOADER text dialog supports sizes according to needs of the messages it displays.

Keyboard Driver

Instead of relying on the BIOS 31 or DOS key input support, the OSLOADER program creates its own keyboard controller hardware interface driver 43, reducing the risks that the password knowledge could be compromised by a software keylogger. The keyboard driver 43 processes all keys, including all modifier keys, so the password can match the user enrollment password, which would of most likely been entered under Windows key event routines.

Video Driver

Instead of relying on the BIOS 31 or DOS display functions, the OSLOADER program couples directly to the display hardware when displaying screen messages. Again, this is done to prevent rogue programs from capturing the string data and echoing it to a remote system. The only way for the string data to be captured would be some code that is grabbing all of screen memory all the time. Knowing this, OSLOADER disables all ISA interrupts to prevent such code from grabbing the screen off of a timer interrupt or other periodic interrupts.

Random Number Generator

A random number generator is supposed to generate a sequence of numbers that lack any pattern, i.e., appear random. Many computer-based systems for random number generation often fall short of this goal, though they may meet some basic statistical tests for randomness. Also, since there is no random number support which an x86 assembler has access to through a library, OSLOADER creates a random number function. The random number function is an x86 assembler version of random number generator methods created by George Marsaglia, a mathematician and computer scientist. This function uses the multiply-with-carry method for random numbers (or the Marsaglia polar method). It is desirable to use a hardware random number generator, if available, over a software random number generator.

Scrambling the Character Set

Figures 4B, 5:
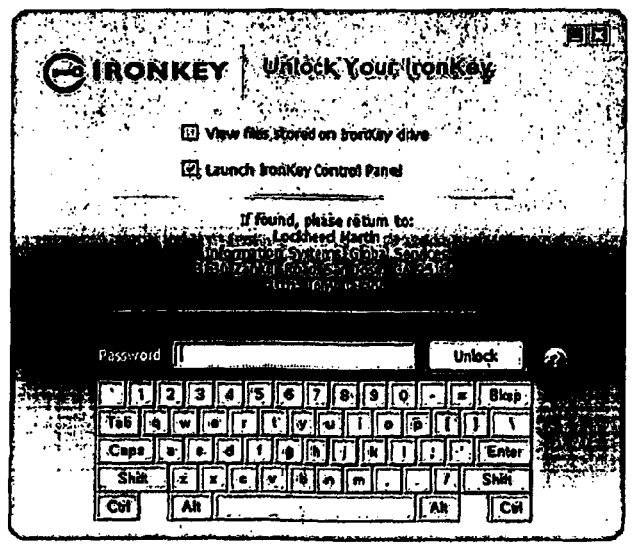
FIG. 4b illustrates scrambling the character set to harden against screen grabbers.
FIG. 5 illustrates an example of a soft-keyboard password entry window.

OSLOADER makes use of the random number generator and creates another level of obfuscation, by constantly scrambling the character set and the corresponding font images. The user sees no difference, and no flicker, but a rogue program trying to read the screen memory only processes 'garbage.' Most programs are written so that they know that character number 041h is the ASCII character 'A'. However if the font images are randomly shuffled, and the strings are shuffled in the exact same order, the screen information only makes sense to a human. The normal 'AB' string would be represented by the hex numbers: 041h, 042h. After scrambling the character set, the 'AB' string would be represented by the hex numbers 0B7h, 003h (in the example shown in FIG. 4b). FIG. 4b illustrates scrambling the character set to harden against screen grabbers.

Authenticated Boot Secure Environment

Using the authenticated "Boot Secure" environment, which comprises the "Boot Secure" environment tied to a secure BIOS 27, allows a user to plug a secure environment derived from a specific USB device 12 enforced by the secure BIOS 27 on booting the host computer 11. The authenticated Boot Secure environment integrates the Boot Secure environment with a secure BIOS 27 to strictly enforce and only allow a specific, secure USB device 12 (or a set of trusted, secure USB devices 12) by serial number, for example, to be cold booted from the host computer 11. This requires that a secure BIOS 27 be flashed onto the RAM 16 of the host computer 11 which replaces the original factory BIOS 31. Otherwise, all other functionality remains the same.

Keyboard Logger Attack Prevention

A news release entitled "Botnet economy runs wild," posted on the Network World website, stated that "Cybercriminals have created a global business with a supply chain every bit as organized and sophisticated as that of any legitimate business. The difference is that cybercrime takes advantage of unsuspecting consumers and insecure businesses to steal untold amounts of money. There are 5 million to 5.5 million botnets in active rotation at any time. How much money is being stolen by cybercriminals? No one knows, and no one even knows how to go about coming up with that number."

The following is taken from an article entitled "How does this protect me against keystroke-logging spyware?" posted on the IronKey website: "A word of caution: if your computer is infected with a keystroke logger before you purchase your IronKey, and if you initially enter your passwords into your IronKey on the computer that is already infected with a keystroke logger, then your passwords of course will be tracked by that keystroke logger. For this reason, we recommend that you setup your IronKey and initially enter your passwords into the Password Manager from a computer that you control and that has anti-spyware and anti-virus software installed. We recommend that you update your anti-spyware and anti-virus definitions and run a sweep of your PC before setting up your IronKey."

Keystroke logging (a.k.a., keylogging) is a method of capturing and recording a user's keystrokes. Keyloggers can be useful in determining how a user interacts with a system, and are sometimes used to measure employee productivity. However, a keylogger can be just as useful to the thief or hacker, providing a means to obtain passwords, PINs, credit card numbers, and other sensitive information. The reality is that keyloggers are widely available on the internet as offerings for 'parental control'.

Keylogging can be accomplished both in hardware and software. Hardware keyloggers are commercially available devices that come in three types: (1) inline devices that are attached to a keyboard cable, (2) devices that are installed inside standard keyboards, and (3) actual keyboard replacements with built-in keyloggers. The devices that are installed or built-in the keyboard are the most difficult to detect. However; even the inline device may be made to look like standard USB hubs.

In general, there is no easy way to eliminate keyloggers. However, there are limitations in the design of keyloggers that can be exploited. For instance, a hardware keylogger can only log the keys from keyboards 'up river' from where the keylogger is installed. If the user is using a notebook PC that is never left in an area where a thief or hacker could get at the hardware, then using the internal keyboard can get around any keylogger installed between the PC and the external keyboard.

Another way to get around a keylogger is to avoid using the key event channel of the host computer 11 by adding a soft-keyboard to a target application. A soft-keyboard is used with a mouse or Tablet PC pen to depress keys as would be done with one's fingers. An example of a soft-keyboard password entry window 51 is shown in FIG. 5. On the other hand, software keyloggers are software programs that are designed to work on the target computer's operating system to either store the keystrokes locally or transmit them to another computer.

A Kernel-based keylogger is most difficult to write and to combat, since it mimics the real keyboard driver and has unauthorized access to the hardware. Hook-based keyloggers simply hook the operating systems keyboard functions. The operating system pings the keylogger hook for each and every key, as these hooks are designed to facilitate localization.

This soft-keyboard is not like a generic O/S Tablet PC soft-keyboard, which fills the keyboard event queue just as the real keyboard does, presenting no barrier to the software keylogger. Aggressive keyloggers could grab screenshots on every mouse click and determine a user-entered password.

Therefore a method to foil all keyloggers is to alternate the focus between objects on the computer screen as the password is typed. If the password is 'secret', the user would move the focus to the text entry field and type 's', then move the focus to the help icon (for example) and type random letters 'Zy3#diDlr&12&...', focus back on text field and type 'e', and so on.

The following technique further exploits this same weakness in keyloggers (in this case software keyloggers), which cannot determine the keys that are used or discarded. When the password application has focus, it creates a string of randomly generated keys derived from a random key generator and injects them into an operating system keyboard event handler. A password application filter is used to filter out the original randomly generated keys from the key event channel and what is left are the keys that the user has typed in on the keyboard.

Figure 6:
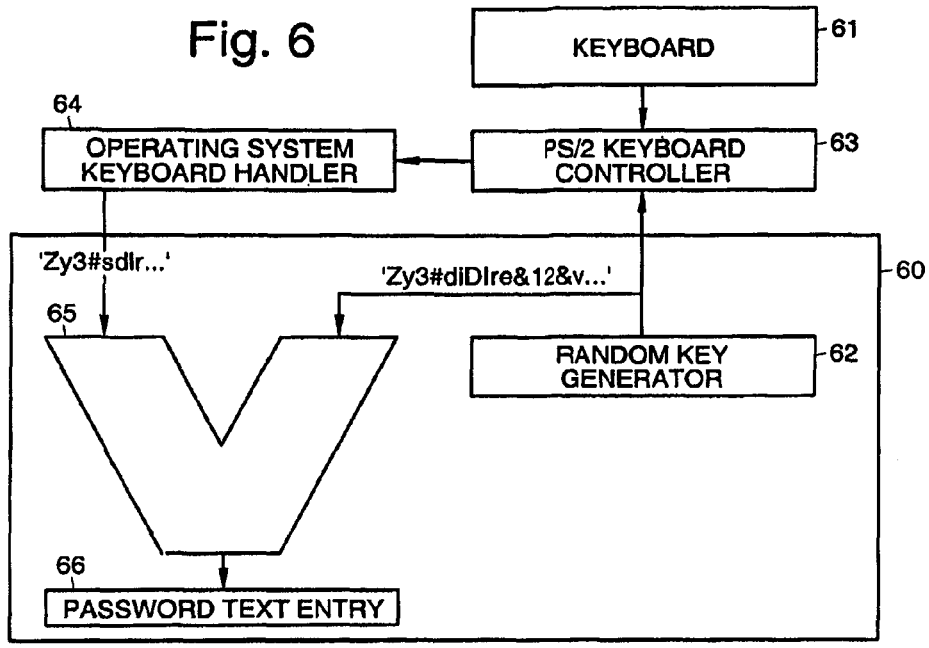
FIG. 6 illustrates password entry hardened against software keyloggers.

FIG. 6 is a block diagram of a password entry mechanism that has been hardened against software keyloggers. More specifically, FIG. 6 illustrates exemplary keyboard logger attack prevention 20g implemented that may use a rotary dial fed by a random number generator 62. FIG. 6 depicts a mechanism that causes typed data to be hidden among a series of randomly generated keys.

Keyloggers that employ very low level O/S calls see everything, but do not understand what they see. Such applications also sees everything, but do not use everything that they see. For example, a keylogger application does not know what to do with keys that are typed anywhere but into the text entry fields, so it discards them. The keylogger application has no easy way to determine which keys are used by the application and which have been discarded.

Therefore a way to foil keyloggers is to use the random number generator and generate a stream of random keys, echo them through the keyboard controller which mixes with the user's typed keys, and then the OSLOADER filters out exactly what was injected, leaving the only the user's typed keys.

In this embodiment shown in FIG. 5, a password application 60 echoes keys entered via a keyboard 61 through a PS/2 keyboard controller 63, for example, so that an operating system keyboard handler 64 will not be able to distinguish the 'injected keys' (entered via the random number generator 62) from the typed keys (entered via the keyboard 61). It does not matter if the real keyboard 61 is attached to a PS/2 port or a USB port of the host computer 11, the operating system merges both keyboard data streams together. If the PC does not have a PS/2 keyboard controller, the 'key injection' code directs the random keys straight into the operating system's keyboard event handler just like the generic soft-keyboard code does.

Another approach also avoids the key event channel. The password application starts off displaying a random number, then the user uses up/down arrow keys, a rotary dial, and/or mouse buttons to adjust each character to match the password. This completely defeats the keyloggers, because there is no useful information unless one knows the randomly generated starting point.

However, this approach is susceptible to the same aggressive keyloggers that grab screenshots on every mouse click to capture the password. To defeat this type of aggressive screen grabbing malware, the security password must not be displayed on the screen and by redesigning the USB device 12 to have its own LCD screen 52 solve this (see FIG. 7).

Figure 7:
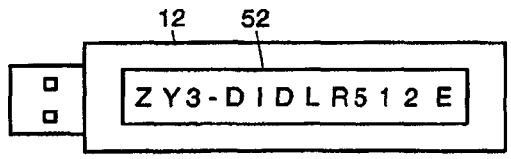
FIG. 7 illustrates an exemplary USB device having a password readout.

FIG. 7 illustrates an exemplary USB device 12 with a security password readout display 52. The security password may be entered from the USB device 12 without typing keys on a keyboard attached to the host computer 11. With this USB device 12 with password readout approach, no useful keyboard or mouse data can be captured, nor is there any useful screen data that can be read to reveal the password. The password application starts off displaying a random number, then the user uses up/down arrow keys and/or mouse buttons to adjust each character to match the password. The password to use is generated on the USB device 12 and displayed to the user. A protected password entry window, similar to a soft keyboard, displays a randomly set spin dial combination lock with up/down arrows to scroll through the characters. The idea is to use the up/down arrows to match the password generated from the USB device 12. A keyboard logger would only capture up/down arrows, but not know a starting reference point. Replay attacks will not work because the starting sequence is randomly set each time it is used.

Hardware keyloggers on an active keyboard channel or software keyloggers that employ very low level operating system calls see everything, but do not understand what the information means. The application also sees everything, but it does not use everything that it sees. For example, the application does not know what to do with keys that are typed anywhere but into text entry fields, so it discards them. The keylogger also has no easy way to determine which keys are used by the application and which have been discarded.

Several Keylogger Obfuscation Techniques may be Utilized:

(1) Create a string of randomly generated keys and inject them into the operating system keyboard event handler 64.

(2) Use the password application filter 65 to filter out the randomly generated keys from the key event channel and what is left are the keys that the user has typed in on the keyboard 61.

(3) The password application starts off displaying a random number, then the user uses up/down arrow keys and/or mouse buttons to adjust each character to match the password. This completely defeats the keyloggers, because there is no useful information unless you know the randomly generated starting point. However, this approach is susceptible to aggressive keyloggers that grab screenshots on every mouse click capturing the final password.

(4) Additionally, the font type can be randomly changed so that different font types are utilized to further obfuscate any keyboard captures.

(5) Modifying the USB device 12 to include a self-contained LCD screen 52 to avoid screen snapshots increases security even further.

(6) One can maintain a persistent authentication of the user by using a non-invasive authentication poll of the user, such as by using face recognition or palm recognition technologies, to maintain positive identification of the user in a non-interruptive manner.

(7) Another approach is for the user to use a special non-QWERTY keyboard that he or she uses during a secure computing session. If it there is a keylogger in the system, the data will not mean anything. This can be improved by generating extra keys that the password application filter 65 filters out.

(8) Randomly switch between fonts to further obfuscate which characters are being utilized. This has much more applicability in a 'global' environment where multiple languages may be utilized.

(9) Additionally, computer forensics can be combined with biometric databases to add a fourth dimension to evaluate the computing environment (i.e., automation to make a "judgment" as to whether or not a host computing environment is "trustworthy" to host the USB device 12, cell phone or PDA solution). For example, a "judgment" can be made depending on who else has used the host computer 11. The device 12 could check biometric fingerprints to see if any other user has used the host computer 11. Likewise, a "judgment" can be made depending on what other USB devices have been used on the host computer 11.

(10) A timer may be implemented to keep track of the last time the device 11 was used. If the device 11 has not been used in some time out period, say 7 days, then the device 11 can 'self-destruct' by deleting all of its contents when it is plugged into the host computer 11.

(11) Furthermore, all user data may be left encrypted for storage on a shared server. Additional software encryption algorithms may supplement the hardware encryption many times over. This would leave the challenge to a hacker to break all the layers of hardware and software encryption in order to utilize the encrypted data. One could carry this one step further to include the user executables as well, so that only the secure, portable and persistent computing environment can run the executables. All other executables would be treated as malware and not be allowed to run.

(12) A soft combination lock could randomly be set with arbitrary characters. The user would use arrow keys or a rotary dial to spin the characters to the correct sequence as displayed on a USB device 12.

To defeat a hardware video attack is more difficult, but not impossible. The first approach is not to display any sensitive information on the computer screen. Password entry is an example of sensitive information that is not displayed since a black dot, for example, is substituted for each keystroke of the password.

This is not practical when it comes to typing sentences, such as writing an email, because it would be difficult and make reading the email next to impossible. This means another display device should be used, that the user brings with him. The display would only accept encrypted data and could plug into the USB bus.

Using an IronKey device 12, for example, implemented in the manner described herein, protects the secure operating system 23 and applications 28, as well as user data 24 from offline attacks. The most serious attack is that of another user capturing the password for the IronKey device 12, but this possibility is minimized since the password is only entered in the Secure Boot environment.

Go Secure Plug and Play Secure USB Drive

The "Go Secure" 20c environment described herein, allows a user to plug his or her Secure USB device 12 into any personal computer 11, enter a password, and begin a secure computing session. When the USB device 12 boots up, initial startup code on the USB device 12 saves and shuts down all tasks, all additional CPUs, and all non-essential devices, and secures a block of memory 16 on the host computer 11 for the secure application(s) 28 to run. On completion of the secure computing session, the user locks the USB device 12 before unplugging it from the host computer 11. The USB device 12 locking procedure allows the secure environment to restore the original operational state of the host computer 11.

The "Go Secure" 20c environment is easier to use than the Boot Secure approach, but it is more difficult to implement. The "Go Secure" 20c environment may be limited to a single tailor-made task, whereas the Boot Secure environment may be more easily extended, because a full operating system runs on the host computer 11.

As before, the "Go Secure" 20c environment works because the USB device 12 carries all of the user's secure application(s) 28 as well as a mini-operating system (nanokernel 23 or minikernel 23) to run the application(s) 28. Using the same USB device 12 as is used in the Boot Secure environment, a CD-ROM image would be responsible for saving the state of the host computer 11, then shut down all tasks, all interrupts, all devices, and all additional CPUs running on the host computer 11. Then, the CD-ROM image loads and executes a mini-environment to verify the user, decrypt the secure storage volume and launch the secure application(s) 28.

This mini-environment takes over Windows® USB functionality with its own USB stack to handle the keyboard/mouse input and communications with the USB device 12. In addition, the mini-environment has its own network driver 43, video driver 43, and a driver 43 for any other device the secure application(s) 28 requires.

An important operation is what happens when the USB device 12 is plugged into the host computer 11. All computer functions must be taken over without exposing the USB device 12 to any security threats. One way to do this is to use the System Management Interrupt (SMI), which stops all processes and processors on the host computer 11 and switches to SMI code. The secure code would replace the SMI handler (if there is one) with a handler that is provided on the USB device 12.

The security concerns regarding the "Go Secure" approach are the same as the Boot Secure approach.

Authenticated, Secure USB Device Boot

This is an integration effort that combines the "Go Secure" 20c environment with a secure BIOS 27 to strictly enforce and only allow a specific, secure USB device 12 (or a set of trusted, secure USB devices 12) by serial number, for example, to be warm-booted from the host computer 11. This requires that the secure BIOS 27 be flashed onto the RAM 16 of the host computer 11 that replaces the original factory BIOS 31. Otherwise, all other functionality remains the same.

Boot Secure Integration—Host Protected Area

If the Boot Secure environment is used on a particular target system, the functionality of the USB device 12 can be integrated into the target system. In this manner, the user does not have to carry the secured notebook computer and the secured USB device 12.

Instead of plugging in the alternate boot device (USB device 12), the BIOS 31 can boot a host protected area 19 on the hard disk drive of the host computer 11. The host protected area 19 contains all software (O/S-loader, operating system, applications) that is to be stored on the USB device 12.

The host protected area 19 is not the same as a hidden partition. The host protected area 19 is completely un-addressable under the O/S environment; even if the OS performs a format on the entire drive the HPA is unaffected.

During the pre-O/S environment, the hard disk is fully addressable, the BIOS 31 then locks the host protected area 19, and from that point on the drive reports a smaller capacity making the host protected area 19 un-addressable. Only a hardware reset can unlock the host protected area 19 again and enable the whole drive to be addressable again, and this action automatically gives control back to the BIOS 31.

Figure 8:
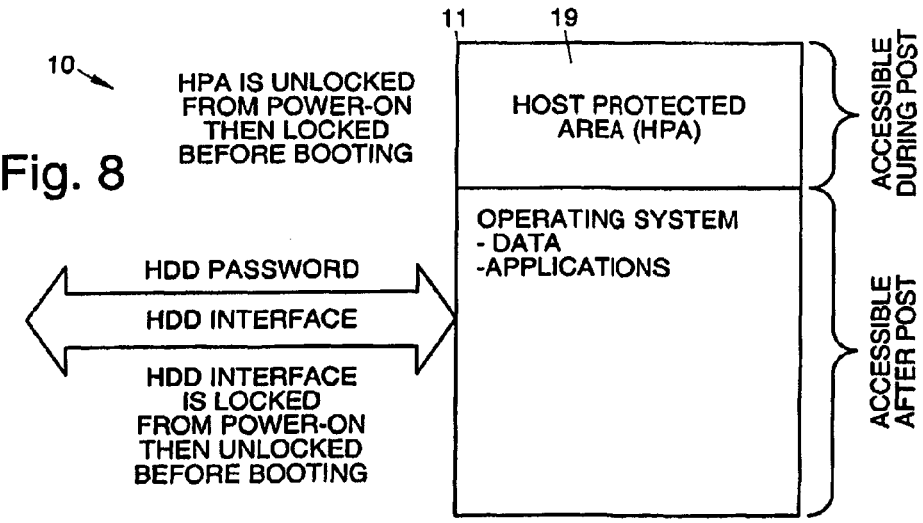
FIG. 8 illustrates a hard disk drive password and host protected area support provided by the exemplary secure, portable and persistent computing environment.

FIG. 8 illustrates hard disk drive password and host protect area support, and shows how the full hard drive is available during POST (i.e., pre-O/S environment) and then is locked before the operating system is launched.

This feature was introduced in the ATA-4 industry specification (1998) and provides a convenient way for BIOS firmware functionality to be extended beyond the motherboard's very small flash part, which holds the BIOS code (typically 512K to 1 MB). Unlike the USB device model, this solution is not limited to just a few gigabytes in size, the host protected area 19 can be made to equal any percentage of the original size of the hard disk.

FIG. 8 also shows how the hard disk interface can be protected with the ATA hard disk password support, which prevents anyone but the user from gaining access to the hard disk data including the host protected area 19. The ATA hard disk password feature locks the hard drive even if it is plugged into another system.

The host protected area 19 may be combined with hard disk password support, and the on-board Trusted Platform Module 21 to encrypt/decrypt the data. Tying this feature to the secure BIOS 27 provides the ability to 'sense' a hardware or software change and take action as defined by a security policy or rule.

Portable High Assurance Guard

Figure 10:
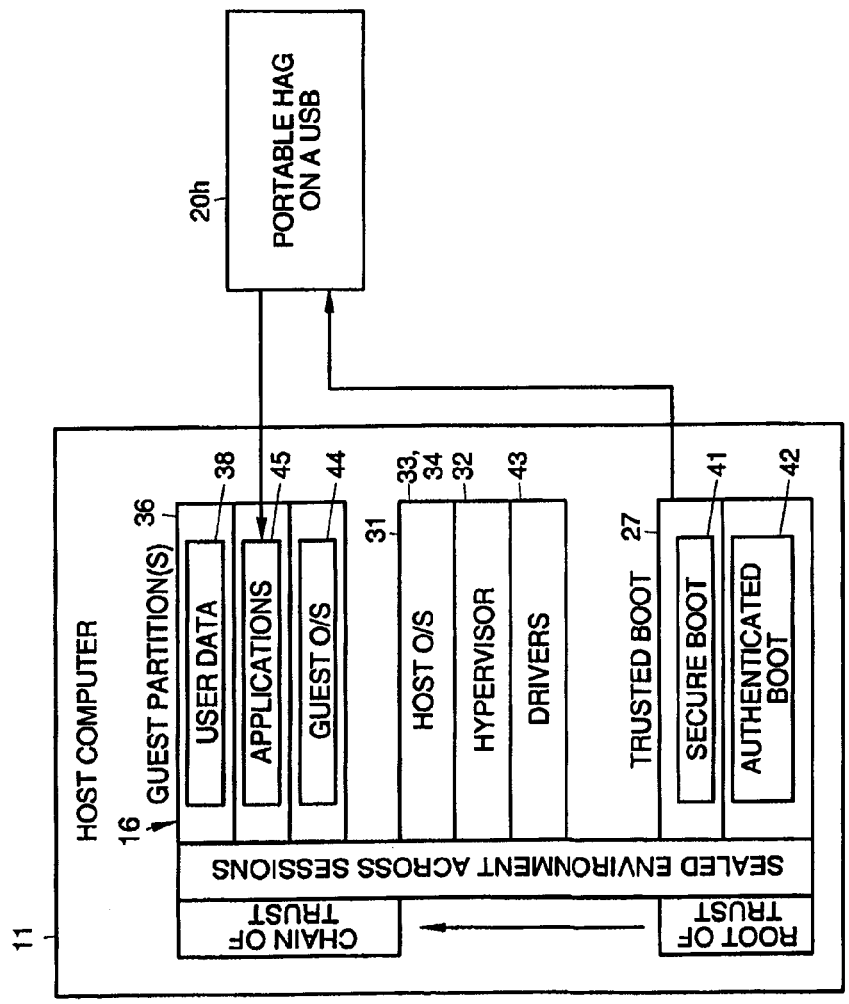
FIG. 10 illustrates an exemplary secure, portable and persistent computing environment comprising a portable high assurance guard implemented using a USB device.
Figure 11:
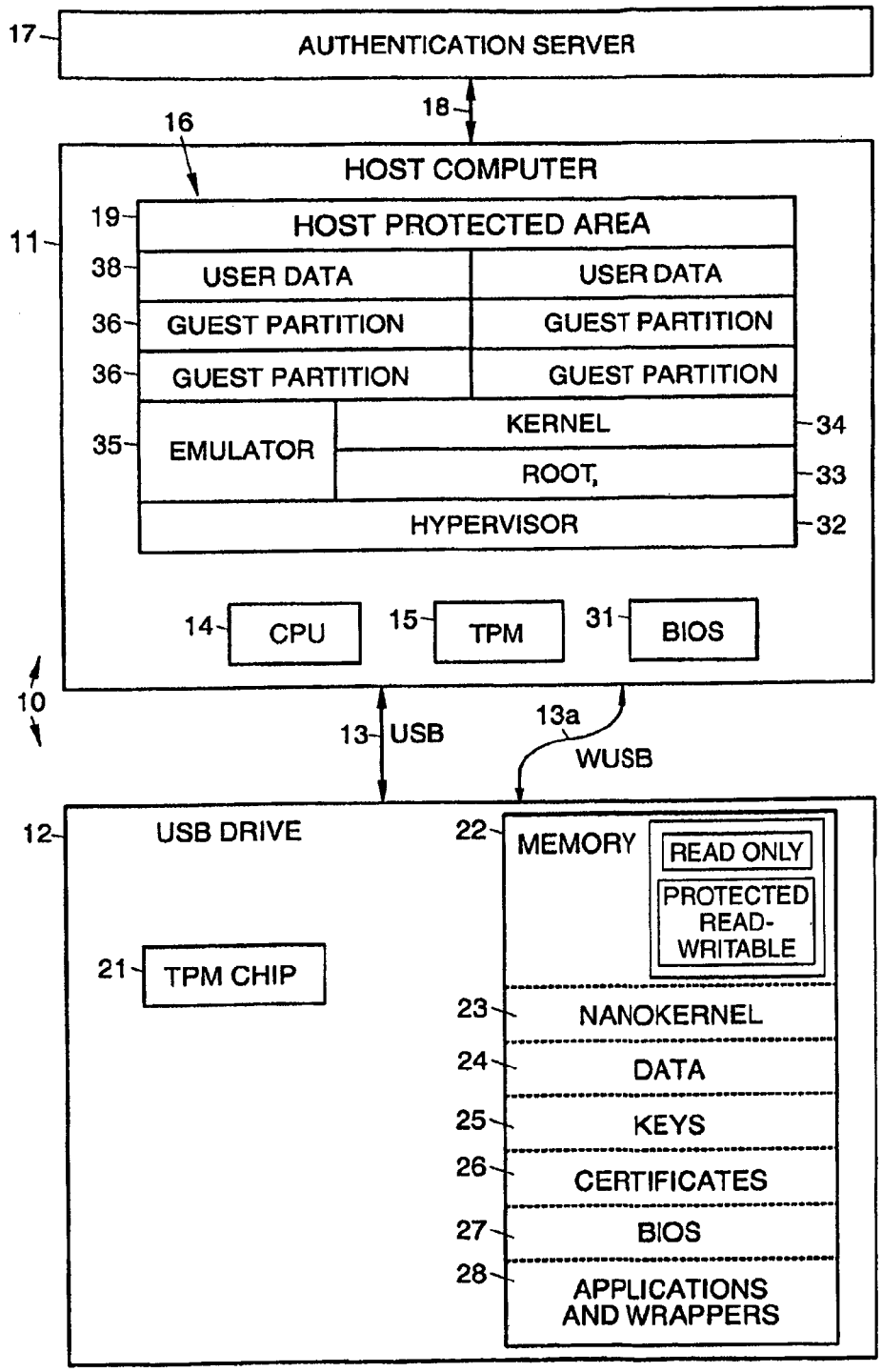
FIG. 11 illustrates exemplary interconnectable personal computer architectures comprising secure, portable and persistent computing environments.

As is shown in FIG. 10, this embodiment of the secure portable USB device 12 relates to software, devices and methods that allow varied mobile devices and computers to interact with server-side software applications to enable the portable high assurance guard to examine traffic going from a higher classification side and reject any traffic that is classified higher than a lower classification. The USB device 12 comprises a 'Layer 8' computer implemented on a USB device 12. The USB device 12 is modified to run the high assurance guard 20h instead of firewall software.

The LinuxDevices news website stated in an article entitled "Yoggie Security Systems has squeezed a hardware firewall for Windows into a USB key sized form-factor" that "When plugged into a host PC's USB port, the Yoggie Pico first uses the open source U-Boot bootloader to copy its Linux-based O/S and application stack from secure, read-only flash memory onto a separate flash-based boot device. Thus, regardless of what attacks the device may endure, it should always boot up in a pristine state.

The second flash device may be a NOR flash device capable of supporting XIP (execute-in-place) or another fast-boot-up scheme, given that the Pico is said to boot significantly faster than the earlier Gatekeeper—40 seconds, including launching the 13 applications, compared to 105 seconds for the original Gatekeeper.

Once running, the Pico establishes an SSL (secure sockets layer) http connection to Yoggie's central servers, where it checks for updated firewall policies and rule sets. It subsequently checks every five minutes, by default."

The portable high assurance guard may be implemented by modifying the Yoggie Pico to execute Radiant Mercury functionality on the USB device 12 to (1) intercept all incoming/outgoing traffic and restrict traffic appropriately, (2) turn any computer into Multi-Level Security enabled device to communicate between different Security Domains, and (3) optionally incorporate a "Trusted Boot" environment. If persistence is desired, then the environment is restricted to a specific USB device 12.

Virtual PC on a USB Drive, Cell Phone or PDA (Virtual Secure Computing Environment)

Figure 9:
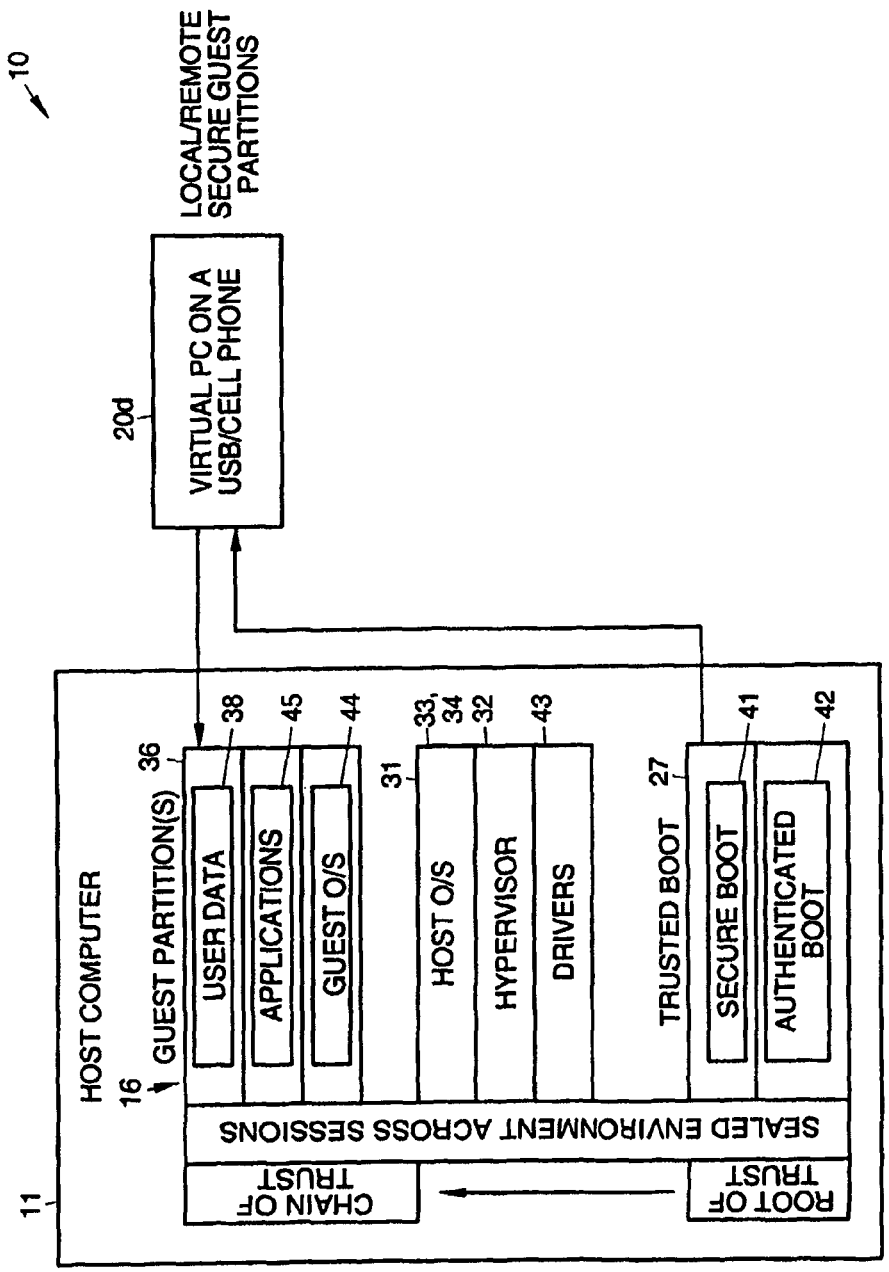
FIG. 9 illustrates an exemplary secure, portable and persistent computing environment comprising a virtual personal computer implemented using a USB device, cell phone or personal digital assistant.

As is shown in FIG. 9, as computers progress towards implementing the Trusted Computing Group (TCG) specifications to ensure secure computing environments, future computing platforms will most-likely support secure computing environments using virtualization technologies to create virtual, secure environments on the computing platform. These environments will most-likely utilize features such as multi-core CPUs to boost processing power, Trusted Platform Modules to secure keys and certificates for authentication, and virtualization technologies to create logical abstractions apart of a device's physical characteristic or location.

This virtual PC 20d embodiment characterizes the virtual secure computing environment implemented on a USB device 12 or embedded into a cell phone, PDA, or other portable device. The USB device 12, cell phone or other portable device, represents the ultimate trusted device that a person carries, and can be used almost anywhere. Similar to the GSM mobile cell phone concept where all GSM infrastructures can accept a Subscriber Identity Module (SIM) card that you can plug and play into any GSM phone to configure it to your phone. This embodiment of the secure, portable and persistent computing environment is disclosed in U.S. patent application Ser. No. 11/985,408, filed Nov. 15, 2007. Other aspects of the computing environments 10 described herein may also be implemented in this embodiment.

The PC on a USB drive or cell phone solution is envisioned to be a plug and play device to enable one to carry a computing environment around so that your data and computing environment is with you at all times. The PC on a USB drive or cell phone solution may be used to buy things (vending machine, shopping, gas, etc), as a banking, ID (CAC card or electronic dog tag), as a FastPass at the toll booths or airport, to start your car, open your car door, to store medical information, replace credit cards, and integrate USB and phone functionalities.

The PC on a USB drive or cell phone solution may incorporate: (1) the trusted platform module chip 21 to hardware secure encryption-authentication keys and certificates; (2) a USB drive-memory to store encrypted data, keys, nanokernel, etc.; (3) Moore's Law memory configuration so that it is inexpensive enough and large enough to scale to meet increasing memory demands and performance requirements; (4) secure BIOS; (5) a nanokernel to boot from, this is a self-contained nanokernel or minikernel to provide a secure boot 41, and simply plug the USB drive 12 into any computer 11 and utilize its CPU, but load the nanokernel to perform the processing and all input/output is done to the secure USB device 12 (i.e. no data is stored on the host computer 11); (6) a list of allowed applications that the secure nanokernel only allow to be run in its environment, any other application is prevented from executing on the data stored on the secure USB device 12; and (7) biometrics to identify a person wherein a USB device 12 may have a fingerprint scanner and or heartbeat sensor, while a cell phone may have voice and/or facial recognition and a wireless USB interface.

There may be at least two form factors: (1) one looks like a USB drive (thumb drive) but contains everything a user needs to work in a "secure, virtual" environment, and the secure USB device 12 would plug into any computer, but only use the nanokernel 23, applications 28, and disk space that are encrypted; and (2) the other one may look like a cell phone or other portable device with all of the above features, but also have a wired or wireless USB interface to allow connection to the host computer 11.

The virtual PC solution adds the capability to bring along a trusted nanokernel 23 and applications 28 that the user or session can run. For example, this solution may support multiple users and support a Multi-Level Security environment as well.

The user's desired computing environment is run from the virtual PC solution, and more than encrypted data is stored on the USB device 12. Essentially, the user has everything that is needed to perform secure computing at one's fingertips, but can be taken to any Internet Café or kiosk to use a USB port on a host computer 11 to provide a computing platform without having to carry around a laptop. AirPhones® or computers on airplanes may be replaced with wireless USB connections to a central computer to allow multiple virtual environments (i.e., one per user) to perform computing with a wireless USB device 12, cell phone or PDA.

Additionally, computer forensics can be combined with biometric databases to add a another dimension to evaluate the computing environment (i.e., automation to make a "judgment" as to whether or not a host computing environment is "trustworthy" to host the USB device 12, cell phone or PDA solution).

In addition to the above, the secure, portable and persistent computing environments 10 may embody "active management technology" (AMT) developed by Intel. The active management technology enables remote computer administration from anywhere in the world.

Active management technology is built into many existing computer platforms, as is the trusted platform module technology, but has not heretofore been exploited in a USB device 12. The active management technology can be adapted to service users at work, home, or while traveling.

Intel discusses AMT on their website. As is disclosed on the Intel website, the active management technology stores hardware and software information in non-volatile memory.

With built-in manageability, Intel AMT allows IT to discover the assets, even while PCs are powered off. With Intel AMT, remote consoles do not rely on local software agents, helping to avoid accidental data loss.

The active management technology requires the computer system to have an Intel® AMT-enabled chipset, network hardware and software, as well as connection with a power source and a corporate network connection. Setup requires configuration by the purchaser and may require scripting with the management console or further integration into existing security frameworks to enable certain functionality. It may also require modifications of implementation of new business processes.

The built-in manageability of Intel AMT provides out-of-band management capabilities to allow IT to remotely heal systems after O/S failures. Alerting and event logging help detect problems quickly to reduce downtime.

Intel AMT System Defense Feature protects your network from threats at the source by proactively blocking incoming threats, reactively containing infected clients before they impact the network, and proactively alerting IT personnel when critical software agents are removed. Intel AMT also helps to protect your network by making it easier to keep software and virus protection consistent and up-to-date across the enterprise. Third-party software can store version numbers or policy data in non-volatile memory for off-hours retrieval or updates.

The active management technology can be configured to automatically provide alerts to enforce a set of policies or rules. The active management technology can track issues and gather statistics real-time. The active management technology can provide a feed to detect computer/network attacks in real-time.

The active management technology can provide a centralized (i.e., server side) ability to integrate other tasks (i.e., key management, or other reactive capabilities) in a real-time fashion based on events/alerts. This provides an integration point for a secure, portable and persistent computing environment authentication server. Regardless of the state of the computer. the active management technology can be configured to do the following. (1) Power up, power down, power cycle, and reset the computer. (2) Redirect the remote computer's boot process, causing it to boot from a network boot image. This allows booting a computer that has a corrupted (or missing) operating system. (3) Redirect the system's I/O during the boot process, allowing an administrator to view and intervene in the boot process. (4) Access and change BIOS settings remotely. (5) Verify that essential software is running on the remote system (for example, anti-virus agents). (6) Rebuild a corrupted hard drive either over the network or from a local image. (7) Obtain the remote computer's hardware asset list (platform, baseboard, BIOS, processor, memory, disks, portable batteries, field replaceable units). (8) Detect suspicious traffic with virus- and worm-like behavior received by or transmitted by the remote system. (9) Block network traffic to and from systems suspected of infection by viruses or worms. (10) Manage hardware packet filters & counters in the on-board network adapter. (11) Receive platform event trap (PET) events from an active management system (AMT) subsystem (for example, events indicating that the operating system is hung, or that a password attack has been attempted).

The secure, portable and persistent computing environments 10 provide for (1) trusted boot ('root of trust') by implementing a secure BIOS or an authenticated boot, (2) cold boot technologies, including "Boot Secure" from a USB device 12, "Boot Secure" from USB device 12 reinforced by a secure BIOS 27 and "Boot Secure" integration with a host protected area 19, (3) warm boot technologies, including "Go Secure" from a USB device 12 and "Go Secure" from a USB device 12 reinforced by the secure BIOS 27, (4) virtual machine technologies including a virtual PC on a USB device 12, cell phone or other portable device reinforced by secure BIOS 20a, (5) driver technologies including a USB stack and keyboard logger attack prevention, and (6) 'Layer 8' technologies including a high assurance guard on a USB device 12 (i.e., a Layer 8 computer).

Thus, in order to address the challenges mentioned in the Background section, the herein-disclosed computing environments 10 minimize security retrofits and re-engineering of systems (legacy, current, and future), provide a secure, portable and persistent computing environment, and provide secure computing sessions with persistence. Minimization of security retrofits and re-engineering of systems may be achieved by addressing security vulnerabilities not envisioned at the time of computer system development, extending the life cycle of legacy and current systems, and providing compatibility with future capabilities such as multi-core processors, virtualization, and cloud computing.

The secure environments 10 may be made theft resistant by using authentication, self-destruct mechanisms, and data encryption and sealing mechanisms. The secure environments 10 may be made resistant to malware infection by providing a protected execution area, accessing trusted applications from local storage, and not using a local or remote host environment. The secure environments 10 protect data by providing safe and secure data storage, and hardware and software data encryption. The secure environments 10 implement secure computing sessions by providing password protection and persistent authentication, safe and secure internet session (i.e., online banking), and do not read or write data to a local disk. The secure environments 10 are persistent in that they provides for ease of use, a portable user experience, continuity of the user experience, user context and content is pre-served, and they are implemented using a device 12 having small, portable and hardened form factor.

It is also to be understood that a wide variety of devices and implementations may be constructed to provide for the secure, portable and persistent computing environments, such as those disclosed with reference to FIG. 2, for example. In particular, the USB device 12 may comprise one or more technologies that provide security and persistence with respect to computing sessions encountered when a user connects the USB device 12 to the host computer 11. Without limiting the scope of the technologies disclosed herein, these embodiments may include a virtual PC 20d embodied on a portable device, a high assurance guard 20h implemented on a portable device, a secure cold boot 20b provided by a secure portable device, keyboard logger attack prevention 20g provided by a secure portable device, a secure warm boot 20c provided by a secure portable device, a secure BIOS 20a provided by a secure portable device, and a trusted platform module (TPM) 21 provided by a secure portable device.

Thus, interconnectable personal computer architectures comprising secure, portable and persistent computing environments have been disclosed. It is to be understood that the above-described embodiments are merely illustrative of some of the many specific embodiments that represent applications of the principles discussed above. Clearly, numerous and other arrangements can be readily devised by those skilled in the art without departing from the scope of the invention.

What is claimed is:

1. An accessory configured to interface with a host computer having a basic input/output system (BIOS) that is initiated on power-up of the host computer to complete a boot sequence, the host computer being configured with at least one hardware device, the accessory comprising:
- a cryptological chip;
- a communications controller configured to interface between the accessory and the host computer;
- a bootable first memory section readable by the host computer without decryption, the first memory configured to be writeable only by a program having an authentication key that is processable by the cryptological chip;
- a second memory section encrypted with a cryptological key processable by the cryptological chip, the second memory configured to be readable or writeable only by a program having the cryptological key;
- the first memory further configured with:
  - a booting software configured to communicate with the BIOS on power-up of the host computer via the communications controller, the booting software carrying instructions causing the host computer to use the first memory to complete the boot sequence;
  - a set of device drivers loaded by the booting software during the boot sequence; and
  - the cryptological key;
  - wherein the booting software contains instructions to load an operating system software and application software from the second memory using the cryptological key;
- the second memory further configured with:
  - the operating system (OS) software configured to regulate the way application software uses the host computer's at least one hardware device;
  - a list software configured to prevent unauthorized application software from running.

2. The accessory of claim 1, wherein the communications controller is a USB controller configured to cause the host computer to recognize the first memory as a read only mass storage device.

3. The accessory of claim 1, wherein the communications controller is configured to communicate wirelessly with the host computer and is recognizable by the BIOS on power-up of the host computer.

4. The accessory of claim 1, further comprising biometric identification apparatus to identify a user attempting to use the apparatus.

5. The accessory of claim 1, wherein the list software is a white list software program.

6. The accessory of claim 1, wherein the booting software is a boot strap software program.

7. The accessory of claim 1, wherein the first memory further includes a trusted BIOS, and the booting software replaces the BIOS on the host computer with the trusted BIOS.

8. The accessory of claim 1, further comprising a trusted server coupled to the host computer by way of a network, and that is configured to restrict the use of unauthorized peripherals.

9. The accessory of claim 1, further comprising keyboard logger attack prevention software that is configured to prevent detection of keystrokes when using the host computer.

* * * * *

UNITED STATES PATENT AND TRADEMARK OFFICE
CERTIFICATE OF CORRECTION

| | |
|---|---|
| PATENT NO. | : 8,335,931 B2 |
| APPLICATION NO. | : 12/214695 |
| DATED | : December 18, 2012 |
| INVENTOR(S) | : Richard M. Lee and Anthony P. Casano |

Page 1 of 1

It is certified that error appears in the above-identified patent and that said Letters Patent is hereby corrected as shown below:

CLAIMS

| Column | Line | PTO | Should Be |
|---|---|---|---|
| 4 | 45 | personal digital assistant; and | personal digital assistant; |
| 4 | 48 | using a USB device. | using a USB device; and |
| 17 | 23 | (nanokemel | (nanokernel |
| 19 | 67 | to get the use's | to get the user's |
| 22 | 17 | However; even the inline | However, even the inline |
| 30 | 38 | pre-served, and they | preserved, and they |

Signed and Sealed this
Nineteenth Day of March, 2013

Teresa Stanek Rea
*Acting Director of the United States Patent and Trademark Office*